United States Patent

Becker

[15] 3,644,111
[45] Feb. 22, 1972

[54] MACHINE FOR THE PRODUCTION OF GLASS BOTTLES OR THE LIKE

[72] Inventor: Kurt Becker, Obernkirchen, Germany
[73] Assignee: Hermann Heye, Obernkirchen, Germany
[22] Filed: Dec. 26, 1968
[21] Appl. No.: 786,899

[30] Foreign Application Priority Data

Jan. 9, 1968 Germany..............................H 65000

[52] U.S. Cl...................................65/158, 18/5, 65/229, 65/241, 65/251, 65/320
[51] Int. Cl. ......................................................C03b 9/40
[58] Field of Search......................65/82, 229, 237, 240, 250, 65/241, 242, 251, 252, 248, 320, 158, 160; 18/5, 320

[56] References Cited

UNITED STATES PATENTS

| | | | |
|---|---|---|---|
| 3,069,860 | 12/1962 | Colchagoff et al........................ | 65/241 |
| 744,008 | 11/1903 | Proeger ................................... | 65/229 |
| 805,027 | 11/1905 | Pawling et al........................... | 65/239 |
| 1,693,843 | 12/1928 | Jaeger...................................... | 65/229 |
| 2,722,084 | 11/1955 | Winder..................................... | 65/237 |
| 2,757,484 | 8/1956 | Winder..................................... | 65/237 |
| 3,142,552 | 7/1964 | Martin...................................... | 65/229 |

Primary Examiner—S. Leon Bashore
Assistant Examiner—Robert L. Lindsay, Jr.
Attorney—Michael S. Striker

[57] ABSTRACT

A press-and-blow bottle-making machine wherein several neck rings orbit about a vertical axis and wherein each neck ring is moved by a separate motor so that the length of intervals during which the rings dwell at various treating stations and the speed of rings during travel between the stations can be selected as a function of the time required for treatment of workpieces carried by the neck rings at or between the stations.

48 Claims, 25 Drawing Figures

INVENTOR
Kurt BECKER
By
his ATTORNEY

INVENTOR
Kurt BECKER

INVENTOR
Kurt BECKER

INVENTOR
Kurt BECKER

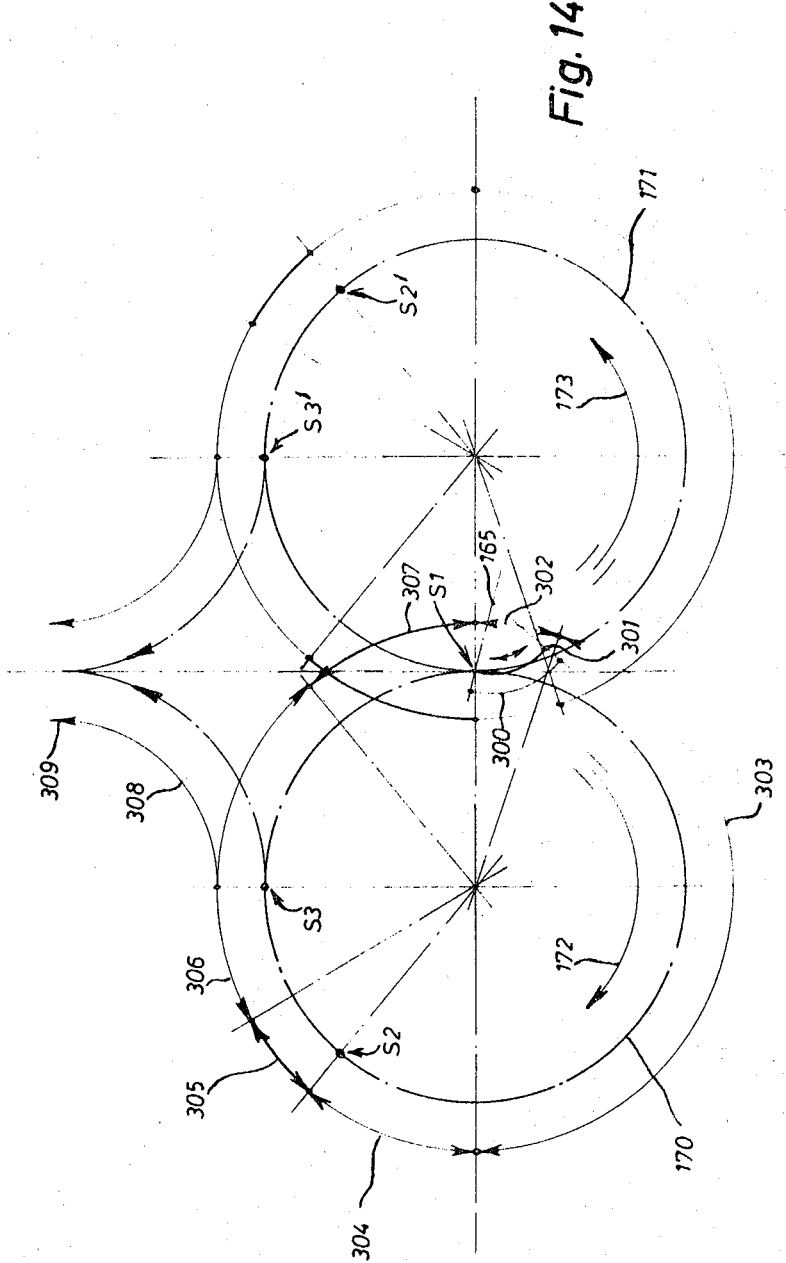

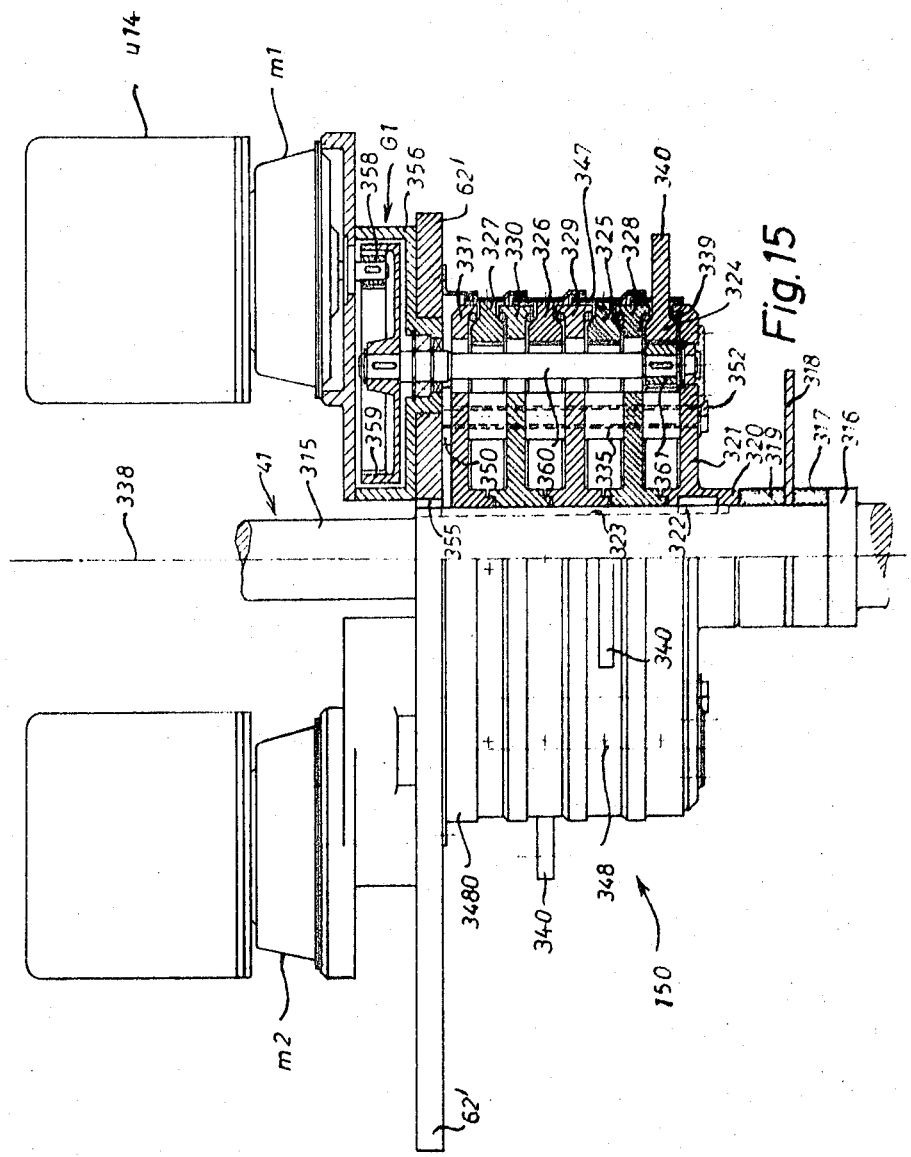

INVENTOR
Kurt BECKER

INVENTOR
Kurt BECKER

INVENTOR
Kurt BECKER

MACHINE FOR THE PRODUCTION OF GLASS BOTTLES OR THE LIKE

BACKGROUND OF THE INVENTION

The present invention relates to a process for the production of hollow articles and to a machine which can be utilized in the practice of such process. More particularly, the invention relates to a process and machine for automatic production of bottles or analogous hollow articles consisting of vitreous or synthetic plastic material by the press-and-blow method.

Presently known press-and-blow machines produce hollow articles in a series of stages. In the first stage, a blank or gob is deformed in a stationary blank mold. In the next-following step, the resulting parison is removed from the blank mold and is reheated on its way to a stationary blow mold wherein the parison is converted into a finished article. In a further step, the finished article is removed from the stationary blow mold and is transported to a conveyor which advances the article to a cooling furnace. A drawback of such machines is that the operation which requires the longest interval of time determines the intervals during which the parisons and finished articles dwell at the respective stations. Thus, the reheating of parisons and their transport to the stationary blow mold takes up the same amount of time as the conversion of parisons into finished articles in response to introduction of blowing medium into parisons which are accommodated in the blow mold. This means that the molds are not used to maximum capacity because a machine can convert a gob into a parison more rapidly than a parison into a finished article or vice versa. In other words, in such conventional press-and-blow machines, only that part or that group of parts which requires the longest interval of time to perform its function during a cycle is used to capacity because such part or such group of parts determines the operating speed of the entire machine.

SUMMARY OF THE INVENTION

It is an object of my invention to provide a novel process for the production of hollow articles in accordance with the press-and-blow method.

Another object of the invention is to provide a process according to which bottles or analogous hollow articles of vitreous or synthetic plastic material can be produced more economically and more rapidly than in accordance with presently known processes.

A further object is to provide a press-and-blow machine wherein the transformation of blanks into hollow articles is carried out with a minimum of delay and with maximum utilization of parts at each of the several stations at which the blanks are treated to be converted into bottles or the like.

An additional object of the invention is to provide the machine with novel and improved transporting means for blanks and hollow articles.

A concomitant object of the invention is to provide a machine wherein the blanks are caused to dwell at several stations during conversion into hollow articles and wherein the duration of dwell at a particular station does not depend on the nature of treatment of the other station or stations.

Still another object of the invention is to provide a multiplex or multiunit machine wherein at least one station is common to several units.

An ancillary object of the invention is to provide an automatic press-and-blow machine which can be converted for the production of greater or lesser quantities of hollow articles per unit of time.

An additional object of the invention is to provide a machine which can convert blanks or gobs of vitreous material into bottles or like hollow articles in a small area, with a minimum of supervision and in such a way that each of a series of successively produced articles is identical with the previously or subsequently produced articles.

The machine of my invention is utilized for the production of hollow articles which consist of vitreous or plastic material. It comprises a plurality of work supporting devices arranged to transport workpieces (such as gobs or blanks, parisons, and finished hollow articles) along at least one predetermined path, separate prime mover means for each work supporting device, and control means for regulating the operation of each prime mover means independently of the other prime mover means. The work supporting devices are preferably movable along an endless path, most preferably along a substantially circular path, past a plurality of stationary and/or mobile treating stations. The workpieces move into registry with successive stations during selected stages of their movement along the path.

It will be seen that the improved process comprises moving a plurality of workpieces along at least one predetermined path and past a plurality of treating stations at and between which the workpieces are treated to ultimately constitute hollow articles, and regulating the speed of workpieces at and between the stations as a function of the time required for treatment at and between the respective stations.

The novel features which are considered as characteristic of the invention are set forth in particular in the appended claims. The improved machine itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 14 is a diagram showing the paths of movement of holders in the duplex machine of FIG. 1;

FIG. 15 is a partly elevational and partly sectional view of a transmission which moves the holders of the right-hand unit in the machine of FIG. 1;

DESCRIPTION OF THE PREFERRED EMBODIMENTS

Figure 1:
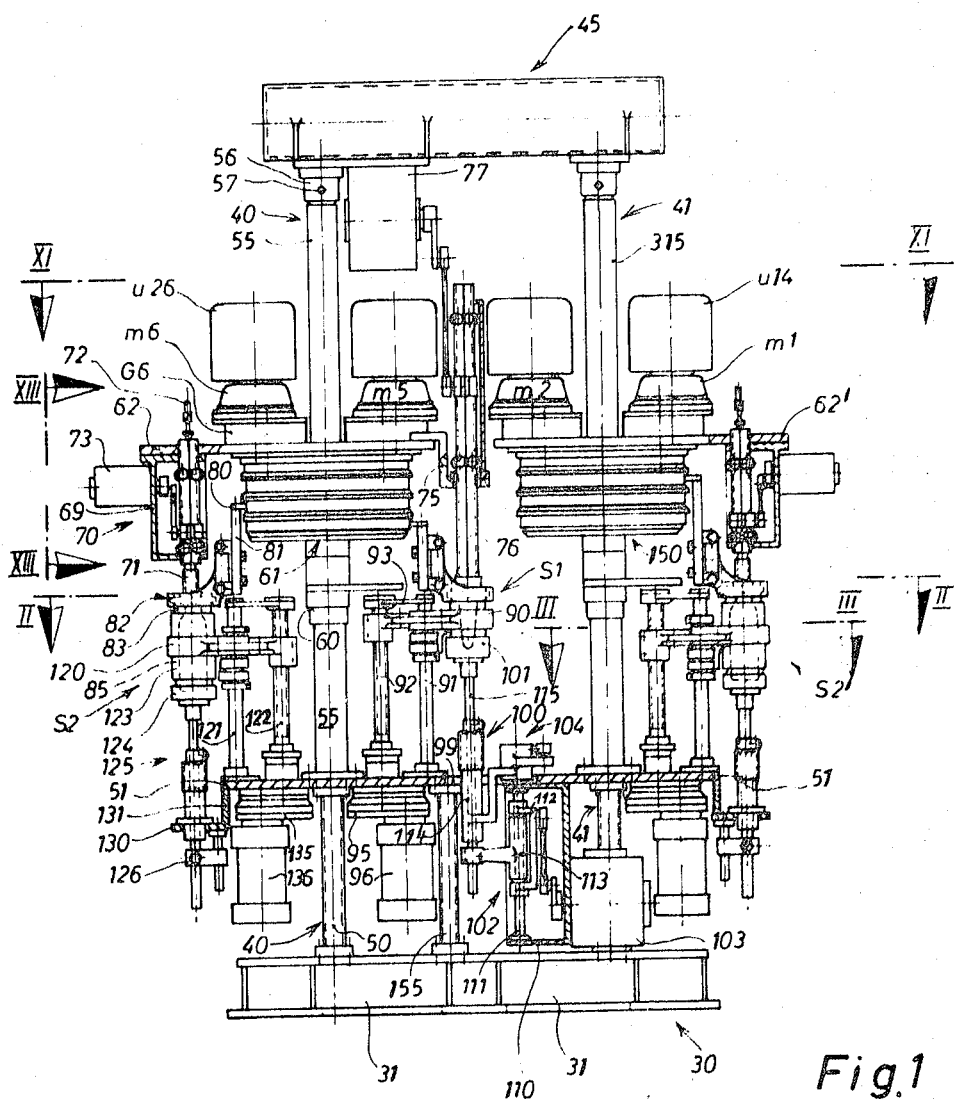
FIG. 1 is a schematic partly elevation and partly vertical sectional view of a duplex press-and-blow machine which embodies the invention, the section being taken in the direction of arrows as seen from the line I—I of FIG. 2.

FIG. 1 shows a duplex press-and-blow bottle-making machine which comprises a frame having a baseplate or bed 30. The latter resembles a pallet and is provided with openings 31 for the prongs of a forklift truck or a like transporting unit, not shown. The frame further includes two upright columns 40, 41 extending upwardly from the baseplate 30 and a crosshead 45 connecting the upper ends of the columns.

The two columns are substantially identical; therefore, the numerals which are applied in FIG. 1 merely denote the parts of one of these columns, namely, the details of the columns 40. This column 40 comprises a tubular lower section 50 which supports a horizontal table or platform 51. The upper section 55 of the column 40 extends from the platform 51 and all the way to the crosshead 45. The upper end portion of the section 55 extends into a coupling sleeve 56 of the crosshead 45 and is separably secured thereto by a coupling pin 57 or an analogous fastener. The parts 30, 40, 41, 45 form a rigid unit.

The crosshead 45 also serves as a pressure tank to supply compressed gaseous fluid to a series of pneumatic (e.g., RN/ROTAC single vane) motors which will be described later.

The lower portion of the section 55 is provided with an annular flange which defines a supporting shoulder 60 located at a level whose distance from the crosshead 45 is approximately twice the distance from the platform 51. The shoulder 60 supports the casing of a transmission 61 which will be described in detail in connection with FIG. 15. A platelike cover 62 of the transmission 61 is guided by the section 55 and serves as a carrier for four drive means each of which includes an electric motor as a prime mover (see the motor $m6$), a portion of a stepdown transmission (see the transmission G6) and a photoelectric signal generator (see the signal generator $u26$). The signal generators form part of control means which regulate the operation of the respective electric motors.

The cover or carrier 62 further supports a downwardly extending housing or guide 69 which forms part of a blowing unit 70. The latter comprises a vertically reciprocable blowing head 71 connected with a supply conduit 72 for blowing medium and a pneumatic motor 73 which is mounted in the housing 69 and has an oscillatory output member.

The valve which controls the admission of compressed fluid to the motor is controlled by the programming system of the machine to thus regulate the speed and/or the direction of rotation of the motor. The exact construction of the motor 73 forms no part of the present invention; it suffices to say that its output member can turn back and forth through angles not exceeding 360°. The output member of the motor 73 serves to move the blowing head 71 up and down in a manner to be described in connection with FIGS. 12 and 13. The controls for the motor 73 include solenoid-operated air valves or like control elements which are not shown in FIG. 1. The operation of valves is regulated by a main programming system which controls the operation of all movable parts of the machine. The programming system will be described later.

The cover or carrier 62 further supports a housing 75 which guides a plunger 76. The latter is movable up and down by a second rotary pneumatic motor 77 which is installed at the underside of the crosshead 45.

The aforementioned transmission 61 on the shoulder 60 of the column 40 comprises four orbiting output members of which only two (namely, e.g., the output member 80) are shown in FIG. 1. Each of these four output members supports a holder 81 for one of four neck rings 82 each of which includes two sections or halves (see the halves 82', 82" shown in FIGS. 9 and 10). Each section of each neck ring 82 supports an intermediate portion or carrier 83 of a composite blow mold. Depending on the position of neck rings 82, the portions 83 either support a parison (i.e., a partially finished workpiece which has undergone deformation by the plunger 76), a finished bottle 85 or another hollow article, or are empty. Each neck ring 82 forms with the corresponding holder 81 a work supporting device.

Figure 2:
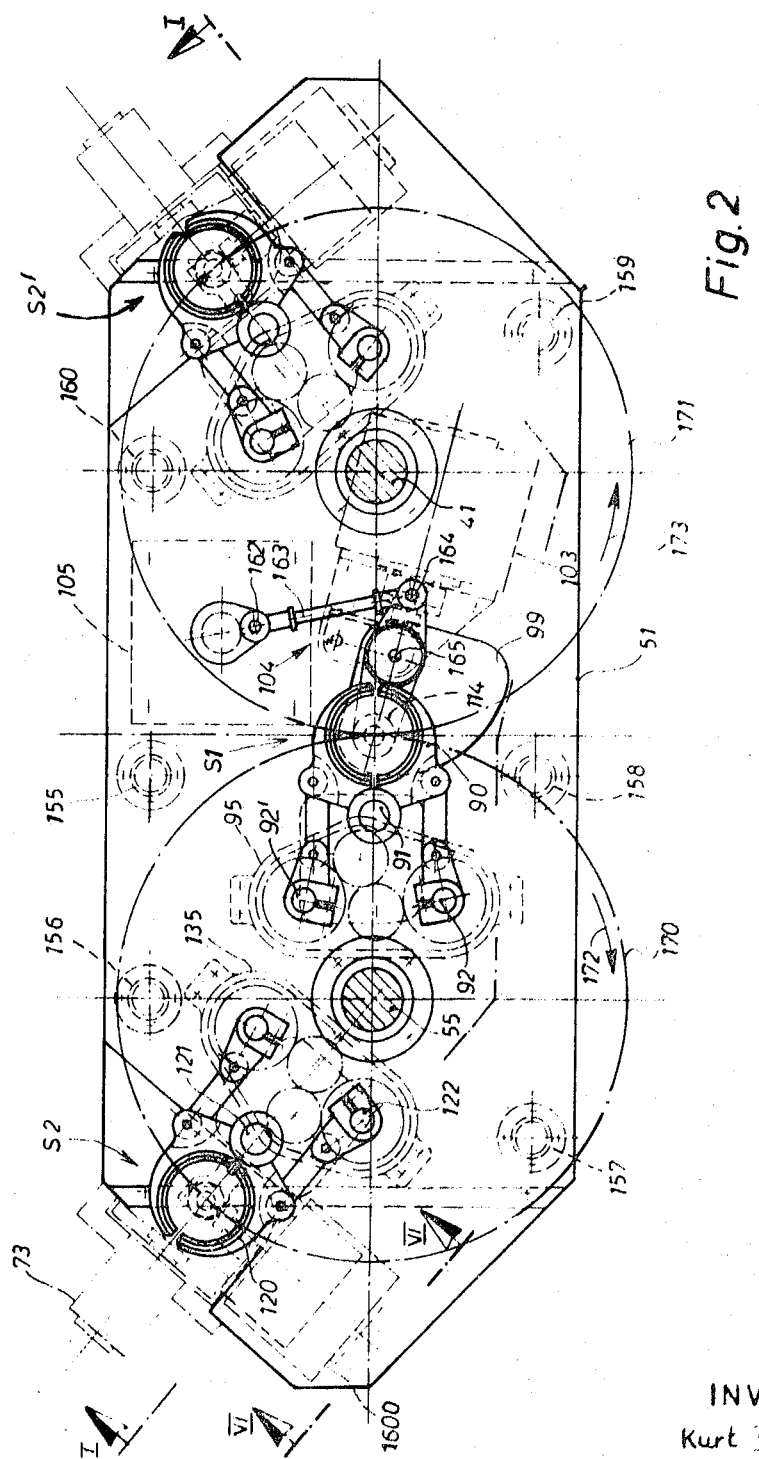
FIG. 2 is an enlarged horizontal sectional view as seen in the direction of arrows from the line II—II of FIG. 1.

The plunger 76 is located at a pressing station $S_1$. The platform 51 supports a tongs or gripper means 90 which is adjacent to station $S_1$ and whose parts or jaws are turnable on a vertical pintle 91 and receive motion from two oscillatable drive shafts 92, 92' (see also FIGS. 3 to 5). The upper end portions of the pintle 91 and shafts 92, 92' are mounted in a stiffening beam 93. The shafts 92, 92' receive motion from a stepdown transmission 95 which is driven by a rotary pneumatic motor 96. The transmission 95 and motor 96 are mounted at the underside of the platform 51. The latter is provided with an opening or cutout 99 for a carriage 100 which supports a blank mold 101. The carriage 100 is caused to perform linear movements (up and down) by a first driving or lifting unit 102 which receives motion from a rotary pneumatic motor 103 (FIG. 2). In addition, the carriage 100 is rotatable about a vertical axis by means of a second driving or oscillating unit 104 which receives motion from a rotary pneumatic motor 105 (see FIG. 2). The unit 104 can move the blank mold 101 in directions at right angles to the latter's vertical axis between a blank-receiving position and a second position of registry with the plunger 76.

The first driving or lifting unit 102 comprises a housing 110 which is suspended on the platform 51 and carries the motor 103 and accommodates a vertical guide rod 111. The guide rod 111 supports a hub or sleeve 113 which supports the carriage 100 and is engaged by a fork 112 driven by the motor 103. A similar sleeve or hub 114 is mounted on a shaft 115 of the blank mold 101 and is turnable by the aforementioned second driving or oscillating unit 104 (see FIG. 2).

The platform 51 further supports a gripper means or tongs 120 for blow molds. This tongs 120 is adjacent to the blowing station $S_2$ which accommodates the aforementioned blowing unit 70. The portions of tongs 120 are turnable on a vertical pintle 121 and receive motion from two vertical drive shafts (only shaft 122 shown in FIG. 1) which are similar to the drive shafts 92, 92' for the tongs 90. The tongs 120 supports the lower sections or halves of a blow mold 123. When the blow mold 123 closes, its lower sections engage a vertically movable blow mold bottom plate 124 and the portions 83 in a neck ring 82. The bottom plate 124 is movable up and down by a driving or lifting unit 125 which is shown in greater detail in FIGS. 6 and 7. This lifting unit 125 receives motion by way of its pin 126 and is supported by a plate 130 which is secured to the platform 51 by a bracket 131. The drive shafts 122 for the tongs 120 receive motion from a stepdown transmission 135 which is driven by a rotary pneumatic motor 136. The parts 135, 136 are connected to each other and are suspended at the underside of the platform 51.

The heretofore described parts of the duplex machine shown in FIG. 1 constitute a fully operative assembly which is capable of producing hollow articles of glass or synthetic plastic material. The right-hand portion of the duplex machine shown in FIG. 1 is provided in order to raise the output and the parts of this right-hand portion are constructed and assembled in the same way as the heretofore described parts with the exception that the pressing station $S_1$ is common to both halves of the duplex machine. The transmission 150 on the right-hand column 41 of FIG. 1 performs the same functions as the transmission 61 on the column 40. The blowing station in the right-hand unit of the machine is shown at $S_2'$. It is clear, however, that each unit of the duplex machine can be provided with a separate pressing station corresponding to the station $S_1$. It is equally within the purview of my invention to employ two pressing stations $S_1$ and a common blowing station $S_2$.

In order to enhance the stability of the machine frame, the platform 51 may be supported by three or more columns. FIG. 1 shows a third column 155 and FIG. 2 shows several additional columns 156, 157, 158, 159, 160.

The left-hand portion of FIG. 2 shows a rotary pneumatic motor 1600 which drives the blow mold bottom plate 124. This FIG. 2 further shows the details of the oscillating unit 104 for the carriage 100 of the blank mold 101. The output shaft of the motor 105 drives an eccentric pin 162 connected to one end of a connecting rod 163. The other end of the connecting rod 163 is coupled to a pin 164 on one arm of a lever which is rockable on a shaft 165. The other arm of the lever is bent downwardly as shown in FIG. 1 and is rigid with the sleeve 114. When the pin 162 rotates, the carriage 100 turns about the axis of the shaft 165 from the position shown in FIG. 2 to a second position in which the blank mold 101 receives a gob or blank from a conventional gob feed, not shown. The feed includes a funnel which receives gobs from a source of plasticized vitreous or synthetic plastic material. During movement to second position, the blank mold 101 turns about the shaft 165 in a counterclockwise direction, as viewed in FIG. 2. The opening 99 in the platform 51 is configurated in such a way that it permits oscillatory movements of the carriage 100 for the blank mold 101. When the blank mold 101 receives a gob, it is remote from the pressing station $S_1$, i.e., it does not register with the plunger 76.

The endless circular paths 170, 171 along which the axes of the neck rings 82 travel are shown in FIG. 2 by phantom lines. The directions of travel of neck rings are denoted by arrows 172, 173.

Figure 3:
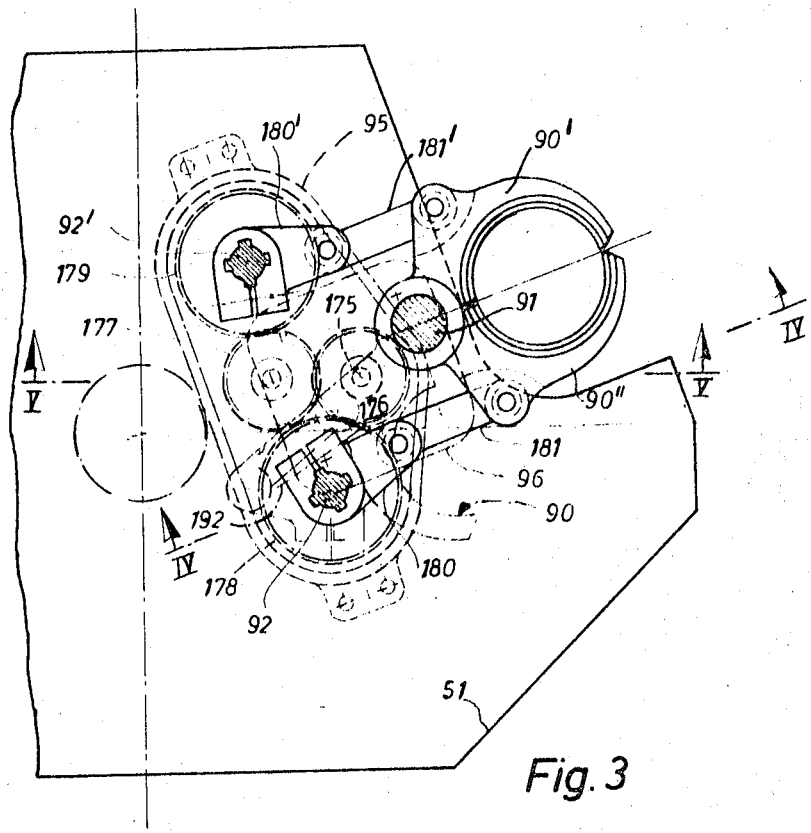
FIG. 3 is an enlarged fragmentary horizontal sectional view as seen in the direction of arrows from the line III—III of FIG. 1.
Figure 4:
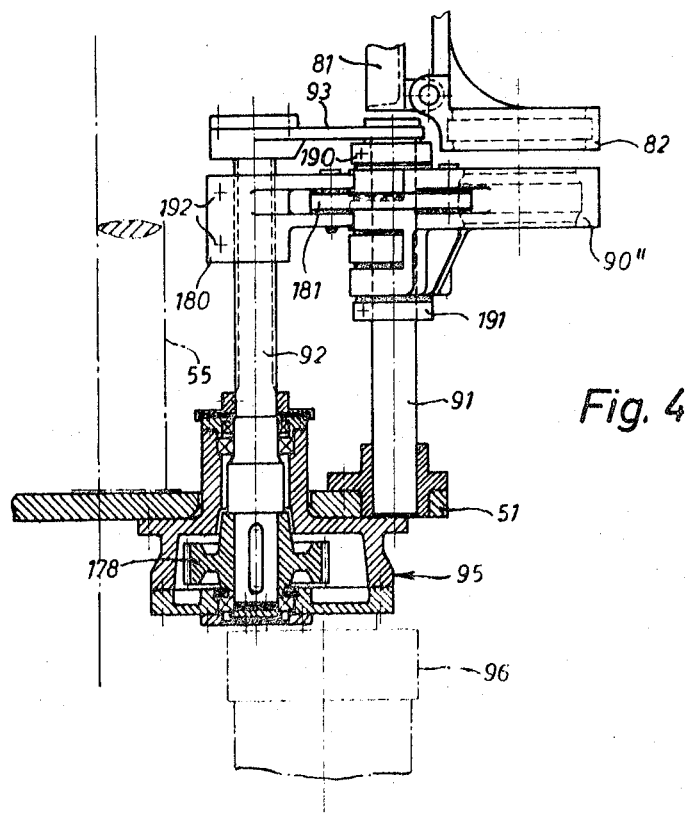
FIG. 4 is a vertical sectional view as seen in the direction of arrows from the line IV—IV of FIG. 3.
Figure 5:
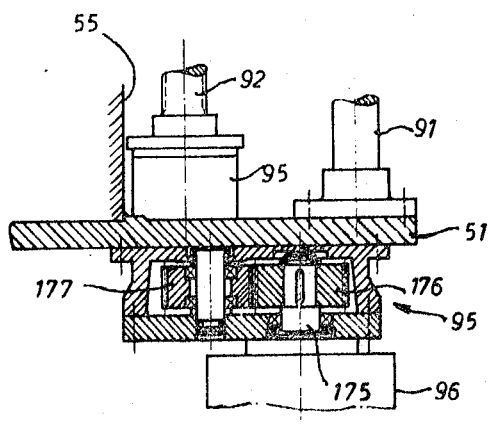
FIG. 5 is a vertical sectional view as seen in the direction of arrows from the line V—V of FIG. 3.

The tongs 90 for blank molds 101 and the tongs 120 for blow molds 123 are preferably of identical size and shape to simplify maintenance, repair and replacement. The tongs 90 is illustrated in FIGS. 3 to 5. The jaws of the tongs 90 are shown at 90' and 90''. The transmission 95 receives motion from the output shaft 175 of the motor 96 (FIG. 5) and includes a spur gear 176 which is keyed to the shaft 175. The gear 176 meshes with an identically dimensioned intermediate gear 177 which meshes with a gear 179 on the drive shaft 92'. The gear 176 is further in mesh with a gear 178 on the drive shaft 92. The gears 178, 179 are identical; therefore the shafts 92, 92' are driven at the same speed and through identical angles but in opposite directions. These shafts are splined and carry radially extending arms 180, 180' which are coupled with links 181, 181' and these links are respectively coupled to the jaws 90'', 90' of the tongs 90. The arms 180, 180' are adjustable in the axial direction of the shafts 92, 92'. When the output shaft 175 rotates back and forth, the jaws 90', 90'' move between the solid line closed positions and the phantom line open positions shown in FIG. 3.

FIG. 4 shows a neck ring 82 in axial alignment with the tongs 90. The pintle 91 enhances the stability of the jaws 90', 90'' and the position of these jaws can be adjusted in the axial direction of the pintle 91 by changing the position of two stop rings 190, 191. Such adjustment must be accompanied by commensurate adjustment of arms 180, 180' relative to the drive shafts 92, 92'. The arms 180, 180' have slotted hubs (see FIG. 3) which can be fixedly secured to the respective drive shafts by screws or bolts 192 indicated in FIG. 4. The adjustability of the distance between the neck ring 82 and tongs 90 renders it possible to utilize different sizes of molds and/or neck rings.

FIG. 5 shows that the transmission 95 occupies very little room in the space between the motor 96 and the underside of the platform 51.

Figure 6:
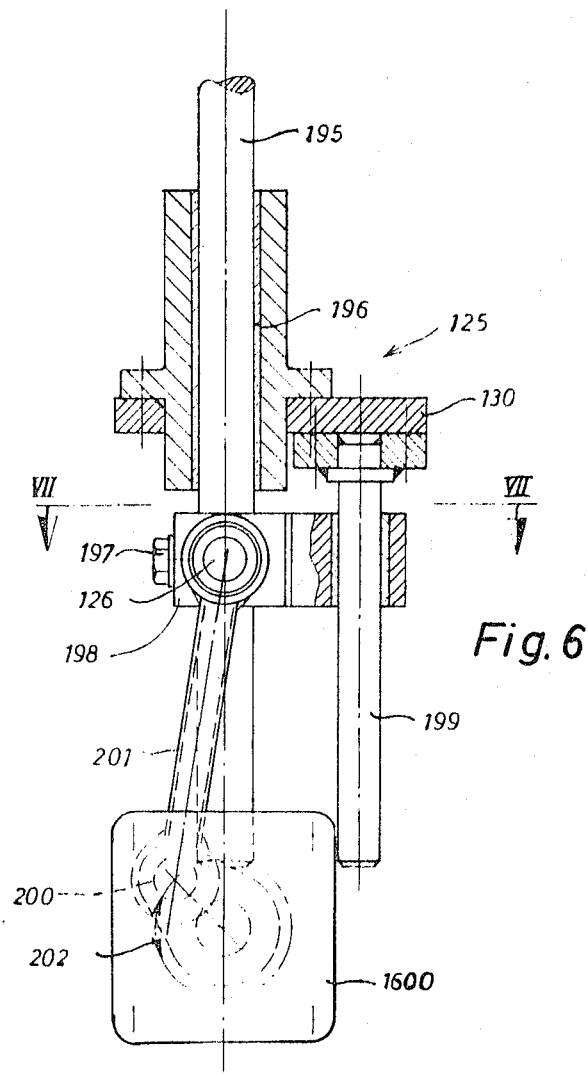
FIG. 6 is an enlarged fragmentary vertical sectional view as seen in the direction of arrows from the line VI—VI of FIG. 2.
Figure 7:
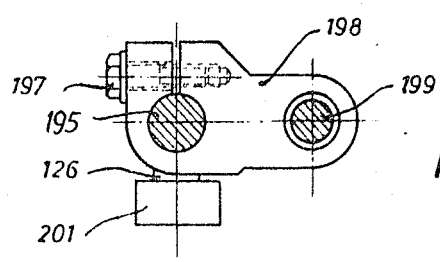
FIG. 7 is a horizontal sectional view as seen in the direction of arrows from the line VII—VII of FIG. 6.

FIG. 6 shows the aforementioned plate 130 which is secured to the platform 51, together with the rotary pneumatic motor 1600, by means of suitable brackets or the like which are not specifically identified in the drawings. The plate 130 supports the lifting unit 125 for the blow mold bottom plate 124, and this lifting unit comprises a slidable rod 195 whose upper end is connected to the bottom 124. The rod 195 is reciprocable in a bearing sleeve 196 which is fixedly mounted in the plate 130. The lower end portion of the rod 195 extends beyond the sleeve 196 and is connected to a crosshead 198 by way of a clamping screw 197. The crosshead 198 is adjustable lengthwise of the rod 195 and carries the aforementioned pin 126. In order to enhance the accuracy of reciprocatory movement of the rod 195, the crosshead 198 is reciprocably guided by a vertical post 199 which is secured to and extends downwardly from the plate 130 in parallelism with the rod 195.

The drive for the pin 126 comprises a connecting rod 201 which is connected to a crank pin 200. The latter is oscillatable back and forth as indicated by double-headed arrow 202.

Figure 8:
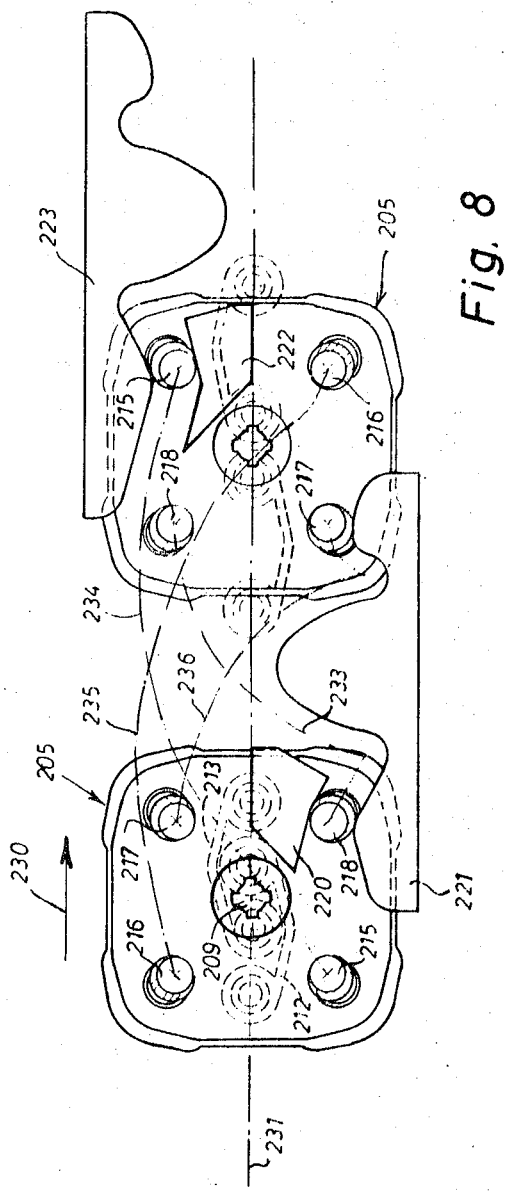
FIG. 8 is a plan view of a mechanism which effects opening and closing of neck rings.
Figure 9:
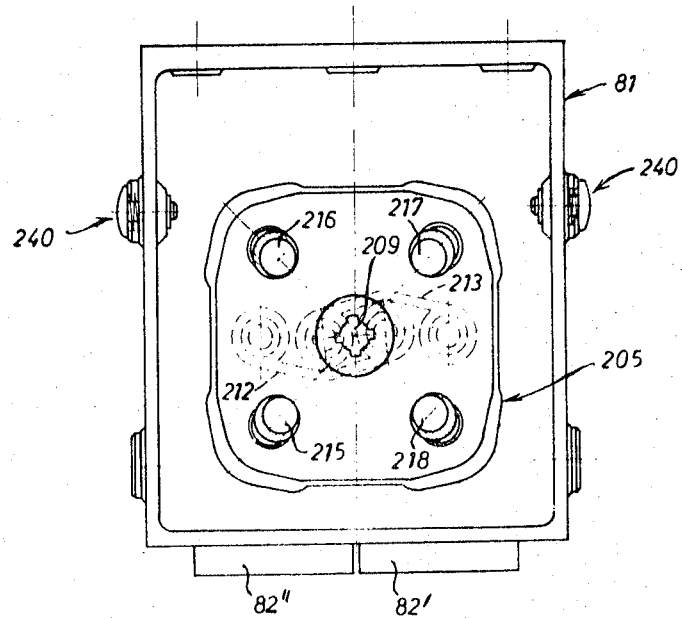
FIG. 9 is an enlarged bottom plan view of a holder for a neck ring.
Figure 10:
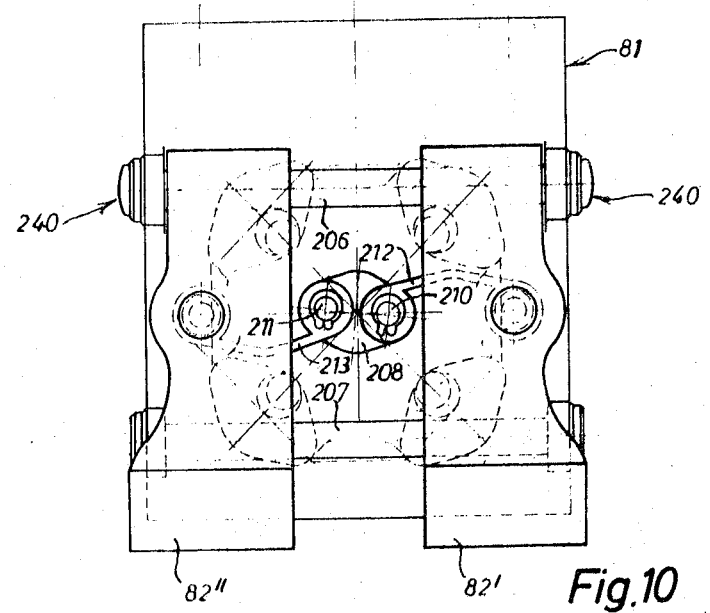
FIG. 10 is a top plan view of the holder.

Upon completed blowing of an article at the blowing station $S_2$ or $S_2'$, the article is advanced to a transfer station $S_3$ or $S_3'$ (FIG. 14). When it reaches the station $S_3$ or $S_3'$, the neck ring 82 must open to release the finished article and to allow such article to advance with a further conveyor located below the level of the neck ring. The opening and subsequent closing of neck rings is effected mechanically in a manner as shown in FIG. 8. This illustration shows a star-shaped switching member 205 in two different extreme positions. FIGS. 9 and 10 show the switching member 205 together with an associated neck ring holder 81. The sections 82', 82'' of the neck ring 82 are reciprocable along shafts 206, 207. The switching member 205 has a shaft 209 which extends through the neck ring holder 81 and is connected with a switching plate 208. The plate 208 has two projections 210, 211 each of which carries an eye provided on one of two leaf springs 212, 213 which are respectively secured to the neck ring sections 82', 82''. The configuration and mounting of leaf springs 212, 213 is such that they can hold the switching member 205 in a closing position (FIG. 9) or in an opening position (FIG. 10). In each of its positions, the switching member 205 is safely locked by the springs 212, 213. This is achieved by mounting the springs in such a way that the axes of projections 210, 211 are caused to move beyond a horizontal plane including the axis of the shaft 209 in each extreme position of the member 205.

Each switching member 205 carries four rollers 215, 216, 217, 218. These rollers constitute followers and can track the faces of fixed cams to thereby cause movement of neck ring sections 82', 82'' with reference to each other. The cams are shown at 220, 221, 222 and 223 (FIG. 8) and are affixed to the frame of the machine. When the switching member 205 advances in the direction indicated by arrow 230 (FIG. 8), the axis of its shaft 209 travels along the line 231, i.e., the holder 81 cannot move up and down.

When it assumes the position shown in the left-hand part of FIG. 8, the switching member 205 maintains the neck ring 82 in closed position (FIG. 9). During movement of the switching member 205 to such closing position, the roller follower 218 engages first the cam 220 and thereupon also the cam 221. While the follower 218 is being guided by these cams, its axis travels along the phantom line path 233. The tongs 82 is open (FIG. 10) when the switching member 205 reaches the position shown in the right-hand part of FIG. 8. During travel between the two positions shown in FIG. 8, the switching member 205 completes one-half of a revolution about the axis of the shaft 209 by turning in a clockwise direction. The axes of rollers followers 215, 216, 217 travel along the phantom line paths 234, 235, 236. When the switching member 205 moves back toward the position shown in the left-hand part of FIG. 8, its roller follower 215 is guided by the cams 222, 223. The switching member then turns in a counterclockwise direction.

FIGS. 9 and 10 show that the neck ring holder 81 is provided with springy cushions 240 which extend beyond its outline. These cushions abut against similar cushions 240 of other holders 81 if two or more holders happen to move close to each other.

Figure 11:
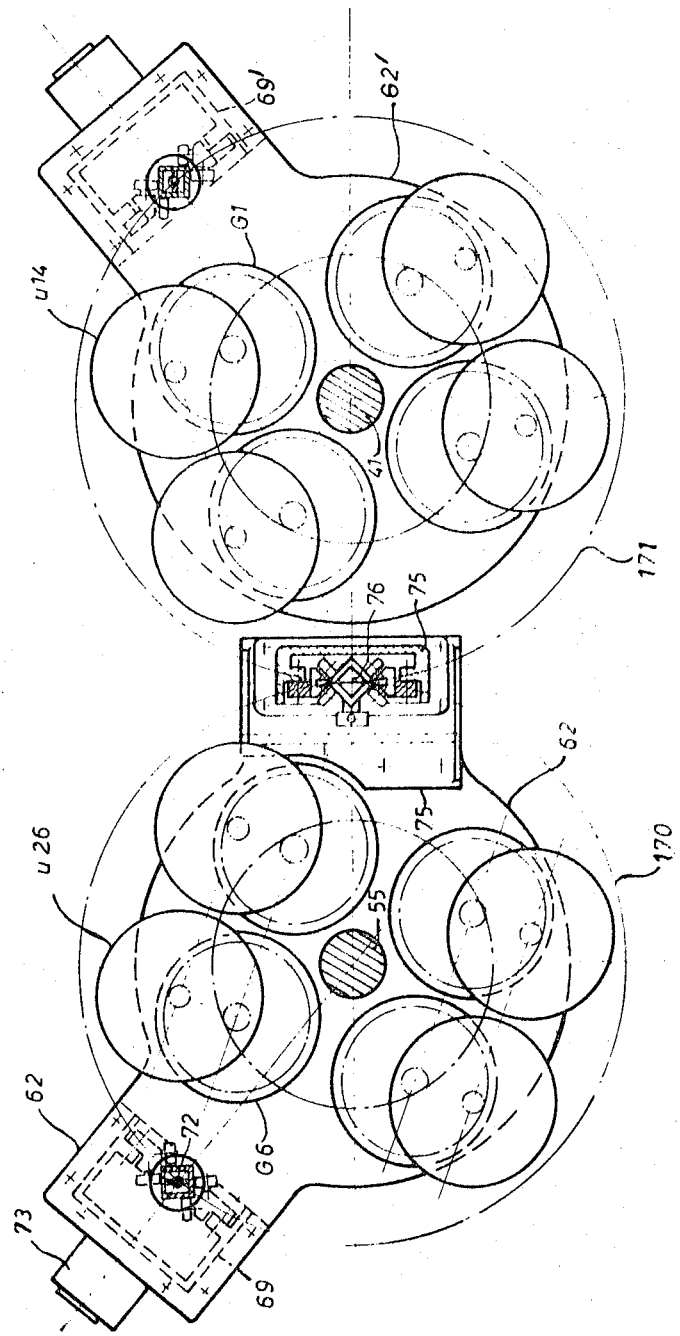
FIG. 11 is a schematic horizontal sectional view as seen in the direction of arrows from the line XI—XI of FIG. 1.

Referring now to FIG. 11, there are shown certain details of the portion of the duplex machine which embodies the invention. Each of the two individual machines is provided with four separate transmissions each of which operates one of four neck ring holders 81. FIG. 11 shows the transmission $G_1$ of the right-hand machine and the transmission $G_6$ of the left-hand machine. The details of such drives will be described with reference to FIG. 15.

Figures 12, 13:
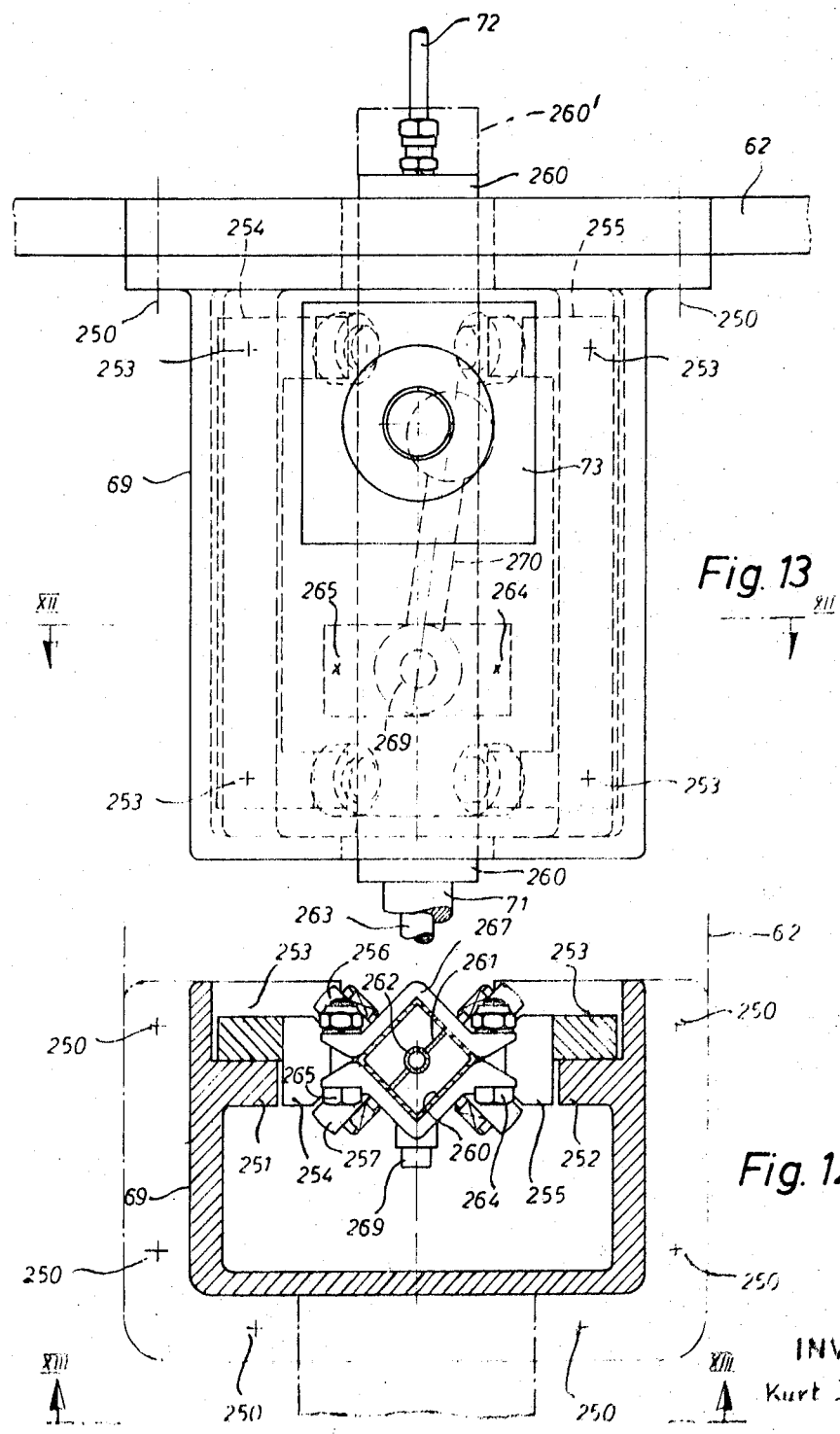
FIG. 12 is a horizontal sectional view as seen in the direction of arrows from the line XII—XII of FIG. 13 and illustrates the details of the housing for the head of the blowing unit.
FIG. 13 is an elevational view as seen in the direction of arrows from the line XIII—XIII of FIGS. 1 and 12.

FIG. 11 further shows the positioning of housings 69, 69' for the heads of the blowing units and the housing 75 for the plunger 76. FIGS. 12 and 13 show the details of parts in the housing 69 for the head 71 of the blowing unit 70. The other housing 69' is of similar design. As shown in FIGS. 12 and 13, the housing 69 is affixed to the underside of the cover 62 by screws 250. The interior of the housing 69 is provided with two vertical ribs 251, 252 supporting carriers 254, 255 which are affixed thereto by screws 253. Each of the carriers 254, 255 supports two pairs of rollers 256, 257 in such a way that each pair of rollers on the carrier 254 is located directly opposite one pair of rollers on the carrier 255. The axes of rollers in each pair of rollers make an angle of 90° and their peripheral surfaces track the adjoining sides of a vertically reciprocable tube 260 of rectangular outline. The tube 260 constitutes an extension of the blowing head 71. The aforementioned supply conduit 72 for blowing medium terminates at the upper end of the tube 260 and is coupled to a pressure conduit 262 which extends axially through the tube 260 and is centered by ribs or fins 261. The pressure conduit 262 is connected to a supply conduit 263 at the lower end of the tube 260.

The tube 260 further supports a vertically adjustable clamp 267 which is secured thereto by screws or bolts 264, 265. The clamp 267 carries a pin 269 which is connected with the lower end of a connecting rod 270. The latter is driven by the motor 73 to move the tube 260 up and down. The upper end position of the tube 260 is shown in FIG. 13 by phantom lines, as at 260'.

FIG. 14 illustrates schematically the paths 170, 171 for the centers of the neck rings 82 in both machines of the duplex structure shown in FIGS. 1 and 11. The manner in which a gob or blank is converted into a finished article will be described with reference to the left-hand machine of FIG. 14. The numeral 300 denotes a path along which the blank mold 101 moves while it receives a gob from the funnel of the gob feed. During such feeding, the blank mold 101, portions 83 and the corresponding neck ring 82 advance toward the center of the tongs 90 at the pressing station S1. On entry of such parts into the station S1, the tongs 90 grips the portions 83 and the blank mold 101 and yieldably centers these parts in the corresponding supporting elements of the machine. The plunger 76 penetrates into the blank mold 101 and converts the gob into a parison. The tongs 90 thereupon opens and the blank mold 101 moves downwardly and advances from the path 300 to the gob feeding station 301. During travel along the stretch 302, the neck ring 82 is accelerated from zero speed to normal speed (stretch 303), and then maintains such normal speed until it enters the braking or decelerating stretch 304 where its speed decreases to zero when it reaches the blowing station S2. The time required for the neck ring 82 to advance along the stretches 302, 303, 304 is selected in such a way that it suffices to reheat the parison. The purpose of reheating and of eventual additional treatment along the stretches 302–304 is to control the temperature in portions of the parison, i.e., the temperature in various layers of the parison wall must be brought to a predetermined optimum value.

When the neck ring 82 enters the blowing station S2, the blow mold bottom plate 124 is moved upwardly and the tongs 120 for the lower blow mold sections 123 (which are suspended therein) grips the portions 83 and the bottom plate 124 to properly center such parts. The blowing head 71 engages the centers of the portions 83 and converts the parison into a finished blown article 85, e.g., a glass bottle. The tongs 120 thereupon opens and the bottom plate 124 returns to its lower end position.

During travel along the stretch 305 of the path 170, the neck ring 82 is accelerated from zero speed to normal speed (when it reaches the stretch 306) and is thereupon decelerated along the stretch 307 back to zero speed when it reaches the pressing station S1. During travel along the stretch 306, the speed of the neck ring 82 remains substantially unchanged. This also applies for travel of the neck ring through the transfer station S3 where the neck ring travels above a takeoff conveyor 308. When it reaches the station S3, the neck ring with a finished article 85 therein is located above the central portion of the conveyor 308. The neck ring opens and allows the article 85 to descend onto the conveyor 308 which transports it to a lehr (cooling oven) in the direction indicated by arrow 309. During travel along that portion of the stretch 306 which is located downstream of the transfer station S3, the neck ring 82 remains open (see FIG. 10) and its portions 83 can be treated, e.g., cleaned and lubricated. The cams 222, 223 of FIG. 8 then cause the neck ring to close (FIG. 9). Closing of the neck ring can take place along the last part of the stretch 306 or during travel along the stretch 307, as long as it is completed when the neck ring returns to the pressing station S1.

The manner in which the neck rings travel along the stations S1, S2' and S3' in the right-hand machine of FIG. 14 is analogous. However, the travel of neck rings in the two machines is controlled in such a way that a neck ring which travels along the path 170 enters the pressing station S1 when a neck ring which travels along the path 171 leaves the pressing station, and vice versa. Thus, the operating cycles of the two machines are phase-displaced with reference to each other because the two machines or units of the illustrated duplex machine receive gobs at a single pressing station S1.

The distance between the neck rings 82 and the conveyor 308 is preferably adjustable. This conveyor may comprise an endless belt which travels at the speed at which the holders 81 travel along the stretch 306.

FIG. 15 illustrates the details of the transmission 150 which is shown in the right-hand part of FIG. 1. The column 41 has a portion or section 315 provided with a shoulder 316 (corresponding to the shoulder 60 on the section 55 of the column 40 shown in FIG. 1) which supports a distancing ring 317 supporting a platform 318 for cams (corresponding to the cams 220–223 of FIG. 1) and for a container (not shown) which accommodates lubricant for the portions 83. The platform 318 further supports a second distancing ring 319 which abuts against the lower end of a hub 320 extending from a bottom wall 321 forming part of the case for the transmission 150. The hub 320 is held against rotation by a key 322 which extends into an axially parallel groove 323 of the section 315. The bottom wall 321 carries a stack of internal gears 324, 325, 326, 327 which are separated by disks 328, 329, 330. Each of these disks has a hub which surrounds the section 315. A similar hub is provided on a top wall 331 which is located above the topmost gear 327. All of the hubs are accurately centered on the section 315 against uncontrolled radial movement. These hubs are spaced axially from each other by distancing elements 335 which are disposed between the disks 328, 329, 330, between the disk 328 and bottom wall 321 and between the disk 330 and top wall 331. The transmission 150 further comprises annuli of spherical rolling elements 339 which are interposed between superimposed parts (such as between the bottom wall 321 and adjoining gear 324). The rolling elements 339 engage tracks provided by surfaces which are inclined with reference to the axis 338 of the column 41. Such inclination of surfaces which form the tracks insures satisfactory guidance of rolling elements 339 against radial movement. Washers which are installed between the distancing elements 335 and the adjoining parts insure requisite axial positioning of rolling elements 339.

Each of the gears 324–327 has a radially outwardly extending output member 340 corresponding to the output member 80 of FIG. 1, and each of these output members 340 carries one of the holders 81 for neck rings 82. The length of each of the four holders 81 which receive motion from the transmission 150 is different so that the four neck rings 82 are located in a common plane which is normal to the axis 338. This is clearly shown for the output members 80 in the transmission 61 of FIG. 1.

Each of the four gears 324–327 in the transmission 150 is surrounded by a ring 347 which is secured thereto by screws 348. The rings 347 overlap each other and thus protect the rolling elements 339 against penetration of dust. The topmost ring 347 cooperates with a further ring 3480 which has a flange secured to the cover 62'. The latter rests on distancing elements 350 which in turn abut against the top wall 331. The distancing elements 335, 350, the bottom wall 321, the top wall 331 and the disks 328–330 are formed with registering bores which accommodate clamping bolts 352 screwed into the cover 62'. The transmission 150 comprises several bolts 352; their function is to hold the walls 321, 331 against relative movement axially of the gears 324–327. A key 355 holds the cover 62' against turning on the column 41. The top face of the cover 62' has four recesses each of which accommodates a portion of one of four housings 356 for the corresponding stepdown transmission (e.g., $G_1$) which are driven by electric motors (e.g., $m_1$). The transmission $G_1$ of FIG. 15 is mounted at a level below the motor $m_1$ and the latter is mounted below the corresponding photoelectric signal generator u14. The motor $m_1$ is bolted to the housing 356 of the transmission $G_1$ and its downwardly extending output shaft carries a pinion 358 which drives an internal gear 359. The latter is mounted on a shaft 360 which is journaled in the corresponding housing 356 and in the bottom wall 321 of the case of transmission 150. The shafts 360 each carry a pinion 361 which meshes with one of the internal gears 324–327.

In accordance with a modification which is not shown in the drawing, the internal gears 324–327 can be replaced by gears with external teeth. Each such gear then comprises an external portion which is without teeth and is rigid with the corresponding output member 340.

The parts 321, 328–331 constitute separating means for the internal gears 324–327 and the two outermost separating means 321, 331 form part of the transmission case. The section 315 constitutes a centering means for the parts 321 and 324–331.

Figure 16:
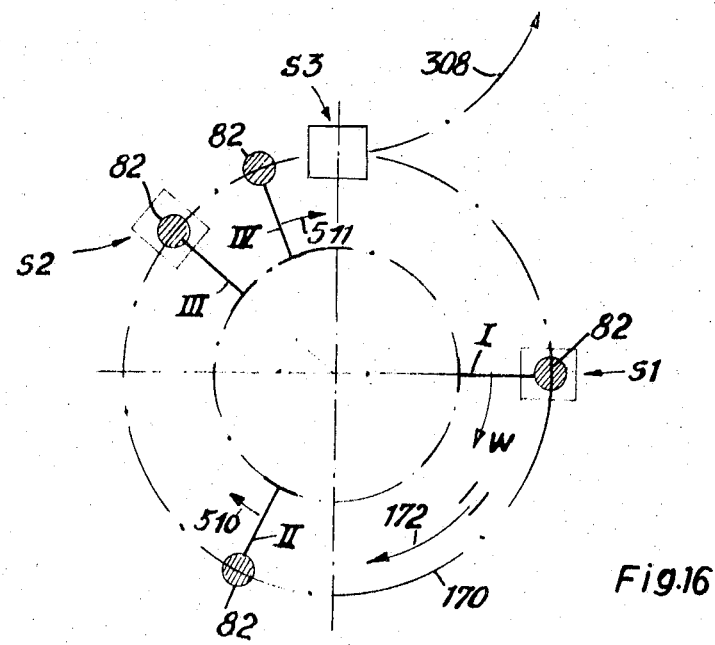
FIG. 16 is a diagram showing the paths of movement of output members in the transmission of FIG. 15.

The operation of driving means in the two machines of FIG. 1 will be explained with reference to the machine shown in the left-hand part of this illustration, i.e., with reference to the machine whose components are arranged to travel along the endless circular path 170 (FIGS. 2, 11 and 14) about the vertical axis of the column 40. In FIG. 16, the four output members (corresponding to the output member 80 shown in FIG. 1) of the transmission 61 are denoted by characters I, II, III and IV. The output members I–IV are driven by gears similar to the gears 324–327 in the transmission 150 of FIG. 15 and each of these output members advances one of four neck rings 82. The centers of the neck rings 82 travel along the endless path 170 in the direction indicated by arrow 172, i.e., from the pressing station S1 to the blowing station S2 and back to the pressing station by way of the transfer station S3. The neck rings 82 come to a full stop at each of the stations S1 and S2 but not at the transfer station S3. In order to increase the output, the periods of dwell at the stations S1 and S2 and the intervals between the dwells of successive neck rings 82 at these stations are reduced to a minimum.

In the stage of operation which is shown in FIG. 16, the output member I dwells at the pressing station S1. When the output member I is set in motion again, its angular displacement W progresses in a manner illustrated in the graph of FIG. 17 wherein the angular displacement is measured along the ordinate and the time along the abscissa. The output member II is in motion (arrow 510) and travels toward the blowing station S2. The parison carried by the portions 83 in neck ring 82 on the output member II is being reheated (stretches 302, 303, 304 in FIG. 14) and is on its way to the blowing station S2. The output member IV advances toward the transfer station S3 (arrow 511) and carries a finished article 85 which is about to descend onto the takeoff conveyor 308 to advance toward the lehr. The output member III dwells at the blowing station S2. As stated before, the transfer of a finished article 85 at the station S3 takes place without stoppage or deceleration of the corresponding output member (IV in FIG. 16).

Figure 17:
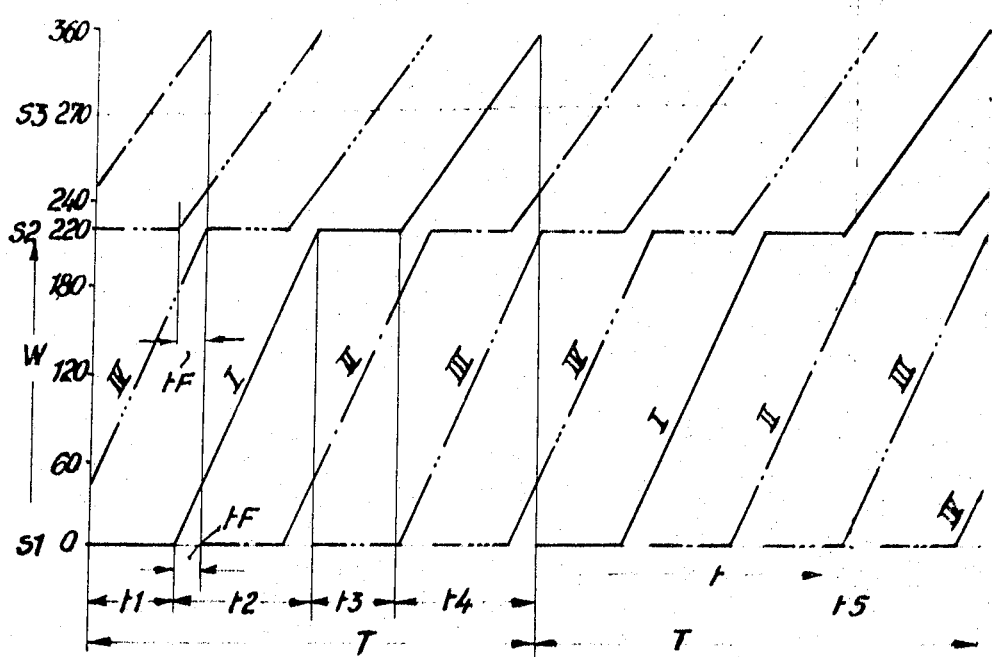
FIG. 17 is a diagram wherein curves indicating angular displacements of the output members in the transmission of FIG. 15 are plotted as functions of time.

Referring to FIG. 17, the angular displacement W of output members I to IV is measured in degrees along the ordinate. The inclined portions of the curves indicate the intervals when the output members are in motion and the horizontal portions of such curves denote the dwells of output members at the stations S1 and S2. For the sake of clarity, the curves denoting movements of the output member I are indicated by heavy solid lines. It will be noted that the output member I dwells at the pressing station S1 for an interval $t_1$, that the output member I thereupon travels toward the blowing station S2 during an interval $t_2$, that the output member I dwells at the station S2 for an interval $t_3$, and that the transport of the output member I back to the station $S_1$ (by way of the transfer station S3) takes up an interval $t_4$. The total cycle takes up the interval $T=t_1+t_2+t_3+t_4$.

FIG. 17 further shows that one or more of the output members II, III, IV are in motion when the output member I dwells at the station S1 or S2 and vice versa. This Figure also shows that the stations S1 and S2 are occupied during the major part of each cycle $T$, i.e., that the parts at the stations S1 and S2 are utilized with nearly maximum efficiency (almost without interruptions). The characters $t_F$ denote the very short intervals during which the stations S1 and S2 are empty. As a rule, each fresh cycle $T$ begins immediately upon completion of the preceding cycle. As shown by the line $t_5$, all four output members I–IV can be kept in motion during certain stages of a cycle $T$. The machine is designed in such a way that the operators can select any desired combination of dwells and movements for each of the four output members.

Figure 18:
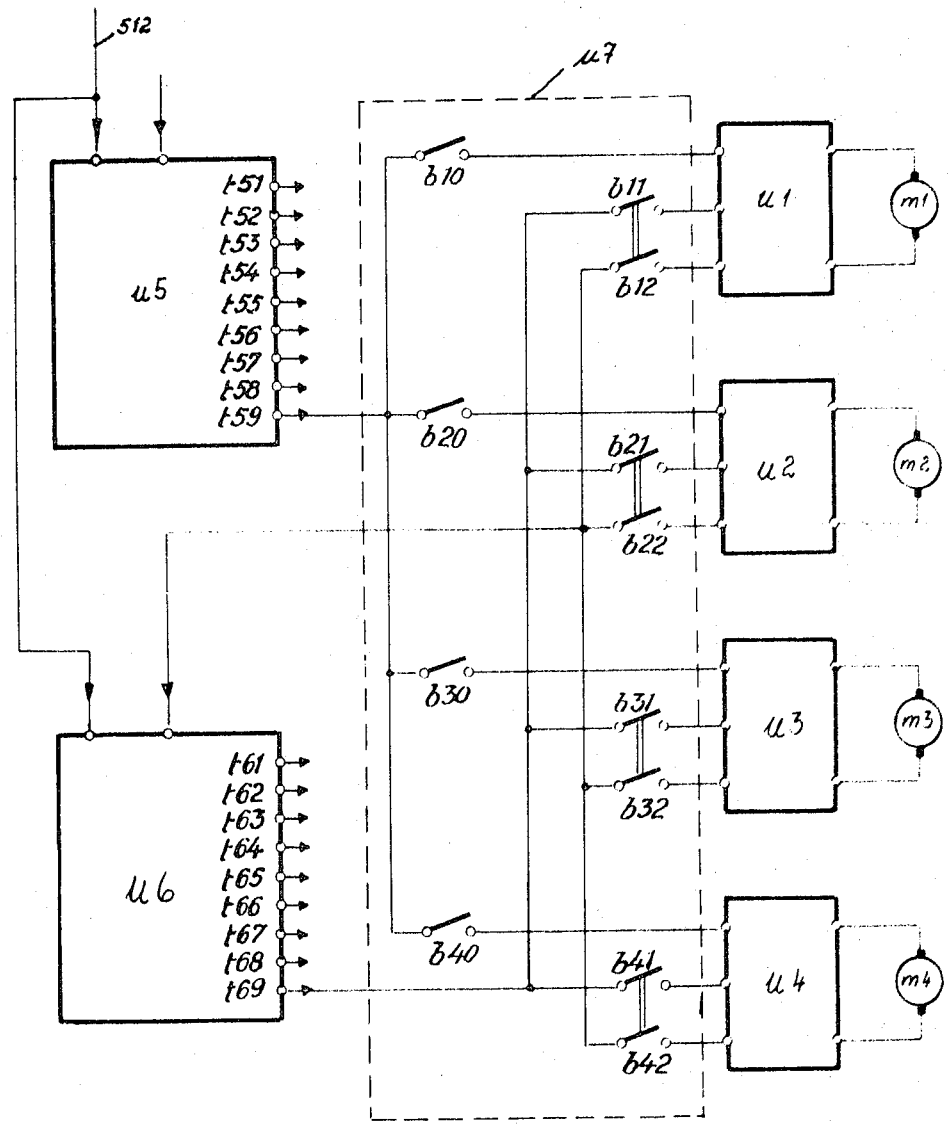
FIG. 18 is a diagram of the control system which operates the motors for the transmission of FIG. 15.

The drive means which effect movements of output members I–IV in a manner as described in connection with FIGS. 16 and 17 are shown schematically in FIG. 18. Such driver means comprise four controllable and reversible prime movers including the electric motors $m_1$ to $m_4$ with associated signal generating devices u1 to u4, two programming units u5, u6 and a logic circuit u7 including the switches $b10$–$b40$ and $b11$–$b42$. As employed in this description, the term prime mover denotes a device which can be set in motion in response to receipt of a start signal; which thereupon completes a predetermined angular displacement (a portion of a single revolution or one or more revolutions) to change the angular position (W) of the corresponding output member I, II, III or IV to a predetermined extent (by way of the associated stepdown transmission, e.g., the transmission $G_1$ shown in FIG. 19); which comes to a halt in an exactly determined position of the corresponding output member to locate the latter at the station S1 or S2; and which produces a stop signal to indicate that the program is completed and that the corresponding output member is located in a new position. The details of one such prime mover will be described in connection with FIG. 19.

The term programming unit is intended to denote a device which can be started in response to reception of an external program start signal; which thereupon produces a series of signals in a predetermined sequence and at predetermined timely spaced intervals which intervals can be fixed in advance or are adjustable; which is thereupon reset in a fully automatic way and reassumes its original state so that it can furnish the same sequence of signals in response to reception of a fresh external program start signal; and which emits a program stop signal upon completion of the program. Such types of programming units are well known and may comprise motor-driven cams or rollers or they may employ punched cards or magnetic recording tape. In the illustrated embodiment, each programming unit comprises a digital counter which receives timing pulses at twice the line frequency (50 cycles per second) so that the timing pulses (received at 512) follow at intervals of 0.01 second.

The gates of each selection counter comprise selector switches so that, depending on the capacity of the selection counter, one can select any desired number, for example, one of numbers 0–999 if each of the units $u5$, $u6$ is a three-stage decade counter. When the number registered on the counter is equal to the selected number, the corresponding gate transmits a signal and such signals can be employed to initiate or terminate certain operations, for example, by causing energization or deenergization of electromagnets.

Since the timing pulses are transmitted at 0.01 second intervals, the output of a gate which is set for the number 273 will transmit a signal when the counter receives the $273^{rd}$ timing pulse, i.e., after elapse of 2.73 seconds following receipt of the program start signal. The programming units $u5$ and $u6$ respectively control the operations at the stations S1 and S2. The number of gates in each of the programming units (selection counters) corresponds to the number of operations which must be carried out at the respective station. Since the timing of output signals is adjustable, the start and/or termination of each operation within a working cycle can be selected at will so that the sequence of operations which are carried out in response to receipt of a program start signal can be regulated with a high degree of accuracy (0.01 second).

If the selection counters are replaced by wired or plug-in programming units, the entire program can be changed with negligible losses in time. Such rapid changes in program are desirable when the machine is used in conducting tests.

In order to insure maximum utilization of the programming units $u5$ and $u6$, only one such unit is provided for each of the stations S1 and S2. In other words, each of these units controls all four drive means at the respective station with resulting savings of six programming units when a machine comprises four neck rings 82. During each complete cycle $T$, each of the programming units $u5$, $u6$ must regulate the operation of four drive means (motors $m_1-m_{additional\ 4}$) as well as the operation of certain additional devices, such as the motor 73 of FIG. 1. The logical circuit $u7$ which insures that the various parts are actuated in desired sequence operates in the following way:

The switch $b10$ closes when the drive means 1 (including the motor $m_1$) maintains the output member I at the pressing station S1, the switch $b20$ closes when the output member II is at a standstill at the station S1, and the switches $b30$, $b40$ close when the output members III, IV are respectively held at the station S1. The switches $b11-b12$, $b21-b22$, $b31-b32$ and $b41-b41-b42$ respectively close when the output members I, II, III, and IV are respectively held at the blowing station S2. It is to be noted that the logical circuit $u7$ of FIG. 18 need not necessarily employ switches. These switches were shown to indicate functions only. In the actual embodiment diode gates are preferred at this time.

With reference to FIG. 14, the movements and dwells of the output member I are programmed in the following way:

At the start of a cycle, the output member I dwells at the pressing station S1. The motor $m_1$ is at a standstill and the switch $b10$ in the logical circuit $u7$ is closed. A gob or blank is then admitted to the gob feeding station 301 and triggers the operation of the programming unit $u5$. The output signal $t51$ (FIG. 18) from the unit $u5$ causes the blank mold 101 and the neck ring 82 on the output member I to move into registry with the tongs 90 which latter closes in response to the output signal $t52$. The output signals $t53$ to $t58$ initiate additional operations including movement of the plunger 76 into and retraction of this plunger from the blank mold 101. The last output signal $t59$ from the programming unit $u5$ initiates the movement of output member I toward the blowing station S2 (i.e., the interval $t1$ of FIG. 17 is completed and the interval $t2$ begins). The drive means 1 (motor $m_1$) is in operation and drives the output member I at a speed which is adjustable (resistor R1 in FIG. 19) so that the output member I with a freshly formed parison leaves the station S1. The switch $b10$ of the logical circuit $u7$ opens while the output member I advances toward the blowing station S2 at a constant speed and comes to a halt upon deceleration (which is adjustable) and positions the parison at the bowing station. The switches $b11-bu7$ close and the motor $m_1$ sends a stop signal to indicate that the interval $t_2$ is ended. Such signal triggers the operation of the programming unit $u6$ which sends a series of output signals at preselected timely spaced intervals. The first signal $t61$ initiates upward movement of the bottom plate 124 at the station S2, the signal $t62$ causes closing of tongs 120, the signals $t63-t68$ initiate or terminate additional operations, and the last signal $t69$ indicates the end of the interval $t3$ (FIG. 17). This last signal $t69$ also starts the drive means 1 (motor $m_1$) to move the output member I away from the station S2, i.e., the interval $t4$ begins whereby the output member I advances the freshly finished hollow article 85 and is accelerated at an adjustable rate. The switches $b11-b12$ open and the output member I then advances at a constant speed past the transfer station S3 and back to the pressing station $S_1$ where it comes to a halt. The finished article is released at the station S3. The switch $b10$ closes when the output member reaches the station S1, i.e., when the cycle $T$ is completed. The drive means 1 produces a stop signal to indicate the end of the interval $t4$. The operation of the programing unit $u5$ is triggered again, when the station 301 receives a fresh gob.

Figure 19:
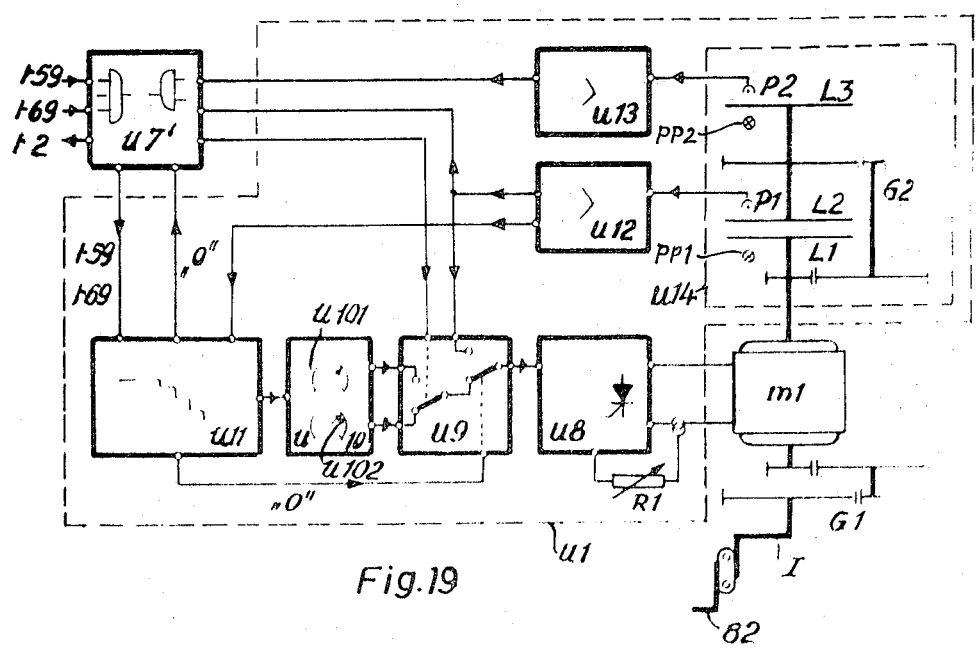
FIG. 19 is a large-scale diagrammatic view of a detail in the structure of FIG. 18.

The construction of the drive means 1 (including the electric motor $m_1$) is shown in FIG. 19. The motor $m_1$ is a direct current motor of regulatable rotational speed. The regulating means is shown at $u8$. The drive means also comprises a control unit or switching unit $u9$, two rated r.p.m. selectors $101$ and $u102$ which are assembled into a rated r.p.m. selecting unit $u10$, a source $u11$ of rated voltage with attenuator, two photoelectric cells $p_1$ and $p_2$ with current amplifiers $u12$ and $u13$, a selection circuit $u7'$ which forms part of the logic circuit $u7$, and three punched disks $L_1$, $L_2$, $L_3$. The disks $L_2$, $L_3$ are driven by a stepdown transmission $G_2$. These disks, with the transmission $G_2$ and aforementioned photoelectric cells $p_1$, $p_2$, constitute the signal generating device $u$. The disk $L_1$ is rotated at the r.p.m. of the motor $m_1$.

The transmission $G_1$ (shown schematically in FIG. 19) drives the output member I and its ratio is the same as that of the transmission $G_2$. Thus, the disks $L_3$ and $L_2$ rotate at the speed of the output member I.

The motor $m_1$ is preferably a direct current shunt-wound motor whose r.p.m. can be regulated by changing the armature voltage. The regulating means $u8$ preferably comprises a rectifier for four-quadrant operation whose output stage includes thyristors and whose output voltage is settable by means of the phase cut-in method. This method of regulation is assumed to be known. However, it should be stated that this type of regulation is here combined with a comparison type of arrangement wherein the actual voltage furnished to the armature is compared to a reference voltage which corresponds to the desired r.p.m. of the motor. If the voltages differ, an error voltage is generated which causes the actual voltage to be changed toward the reference voltage until the difference between actual voltage and desired voltage is reduced toward zero, i.e., that the actual r.p.m. closely approximates or equals the desired r.p.m.

The rated voltage can be used to reverse the direction of rotation of the motor $m_1$. For example, at a positive rated voltage the motor $m_1$ will rotate in a clockwise direction but a negative rated voltage will cause counterclockwise rotation of the motor. This is desirable to bring about a braking action and to reverse the motor, for example, in order to properly position the output member I if the latter happens to advance beyond an optimum position at the station S1 or S2. However, such overshooting is highly unlikely due to the provision of additional safety features which will be described later.

The operation of the motor $m_1$ is controlled in such a way that the armature current can be varied continuously by resistor R1 within a predetermined range but that the strength of such current cannot exceed a predetermined maximum value. Since the torque of a shunt-wound motor is proportional to armature current, the resistor R1 can readily select the maximum permissible torque by full consideration of the mass of driven parts which receive motion from the motor $m_1$ and by consideration of other factors (for example, prevention of undesirable deformation of workpieces which are carried by the output member I). Thus, the resistor $R_1$ determines the acceleration and the time required to attain the desired speed determined by the rated voltage supplied by selection unit $u10$. The drive means of FIG. 19 performs the following functions: It transports a neck ring 82 from the station S1 to the station S2 and positions the parison at the station S2. It also transports a neck ring 82 from the station S2, past the station S3, and back to the station S1 and positions such neck ring at the station S1. To this end, the drive means must receive an appropriate rated voltage. Since the r.p.m. of the motor $m_1$ during transport of a neck ring 82 from the station S1 to the station S2 need not be the same as that during travel of the neck ring from station S2 back to the station S1, it is necessary to furnish two rated voltages. For example, it might be desirable to transport a freshly finished article 85 from the station S2 to the station S3 at a relatively low speed and to drive the parisons from station S1 to the station S2 at a higher speed. A third programmed rated voltage is supplied for precise positioning of neck rings at the stations S1 and S2. The purpose of the switching unit $u9$ is to furnish to the regulating means $u8$ an appropriate rated voltage.

Figure 22:
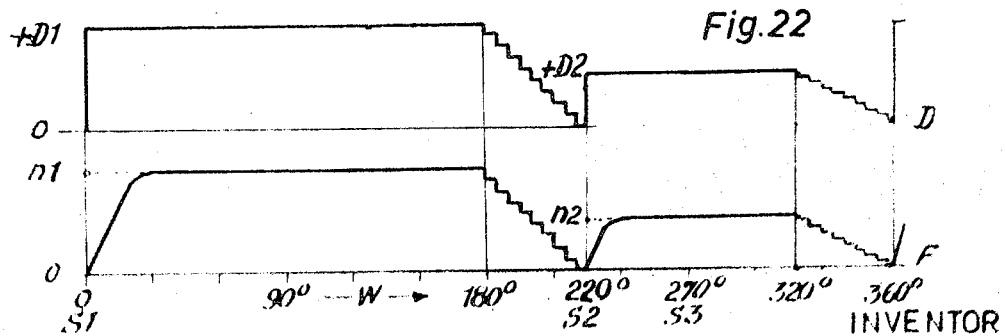
FIG. 22 is another diagram illustrating certain phases in operation of motors for the transmission of FIG. 15.

The two rated rotational speeds for the motor $m_1$ can be selected by the selectors $u101$, of the selection unit $u10$. The two rated speeds can be selected independently for movement of the output member I from station S1 to station S2 (interval $t2$) and from station S2 back to station S1 (interval $t4$). As shown in FIG. 22 at D, the rated value of armature voltage for the motor $m_1$ varies in different angular positions (W) of the output member I. The rated value +D1 selected by the selector $u101$ can be higher than the value +D2 which is selected by the selector $u102$. The curve F indicates that the maximum effective value $n_1$ of r.p.m. of the motor $m_1$ at rated value +D1 is higher than the maximum effective value $n_2$ of r.p.m. at the rated value +D2.

The output member I should leave the station S1 with a maximum permissible acceleration to insure that the station S1 can receive the next output member with a minimum of delay. Furthermore, the intervals required to transport the output member I from the station S1 to the station S2 and thereupon back to station S1 depend on several factors, i.e., not only on the maximum permissible speed at which the parisons and finished articles can be transported without undue deformation. For example, the interval $t2$ for transport of the output member I from the station 1 to the station S2 must be selected by full consideration of the time which is necessary for reheating of parisons. As stated before, the length of intervals $t2$ and $t4$ is selected by the selectors $u$ and $u102$.

It is further necessary to accurately position the output member I at the stations S1 and S2. It is normally necessary, for mechanical reasons, to insure positioning with an accuracy which is within one-sixth of a degree. Also, such accurate positioning should consume very little time and should therefore involve relatively small displacements of the output member upon initial stoppage at the station S1 of S2. At the present time, I prefer to effect such accurate positioning in two stages or steps, namely: While the output member I advances toward a point which is located at a predetermined distance from the station S1 or S2, it is driven at a normal speed which is determined by the rated voltage (+D1, +D2) selected by the selector $u101$ or $u102$. When the output member I reaches such point, the attenuator in the source $u11$ reduces the voltage at a rate which increases with decreasing distance between the output member and the station S1 or S2. This amounts to a coarse positioning of the output member (see the curve D in FIG. 21). Shortly before the output member I reaches the optimum position at the station S1 or S2 (for example, when the output member is within two degrees of such position), the switching unit $u9$ disconnects the selection unit $u10$ and supplies to the motor $m_1$ an accurately determined voltage to insure fine or final positioning of the output member. For example, the voltage necessary for final positioning can be reduced to one-ninth of the voltage needed to drive the motor $m_1$ at maximum speed.

It will be seen that the voltage furnished to the regulating means $u8$ varies in dependency on angular position of the output member I. This can be achieved in a number of ways. For example, the frame of the machine can carry a fixed cam which cooperates with a driven follower to regulate a differential transformer to change the output voltage of the transformer in dependency on the position of the follower and as a function of the configuration of the cam face which is being tracked by the follower. Alternatively, the source $u11$ is controlled by a function potentiometer or a rotating-field transmitter. At the present time, I prefer to utilize in the source $u11$ a digital counter connected to a digital-analog converter. The voltage at the output of the converter is proportional to the numerical value of the signal which is stored in the counter at that time. For example, if one employs a counter which counts from 9 to 0, and if the output voltage of the converter is a linear function of the condition of the counter, changes in the condition of the counter (9,8,7...0) cause corresponding changes in the output voltage (9/9, 8/9, 7/9...0), it being assumed that the counter is of the backward counting type.

Figure 20:
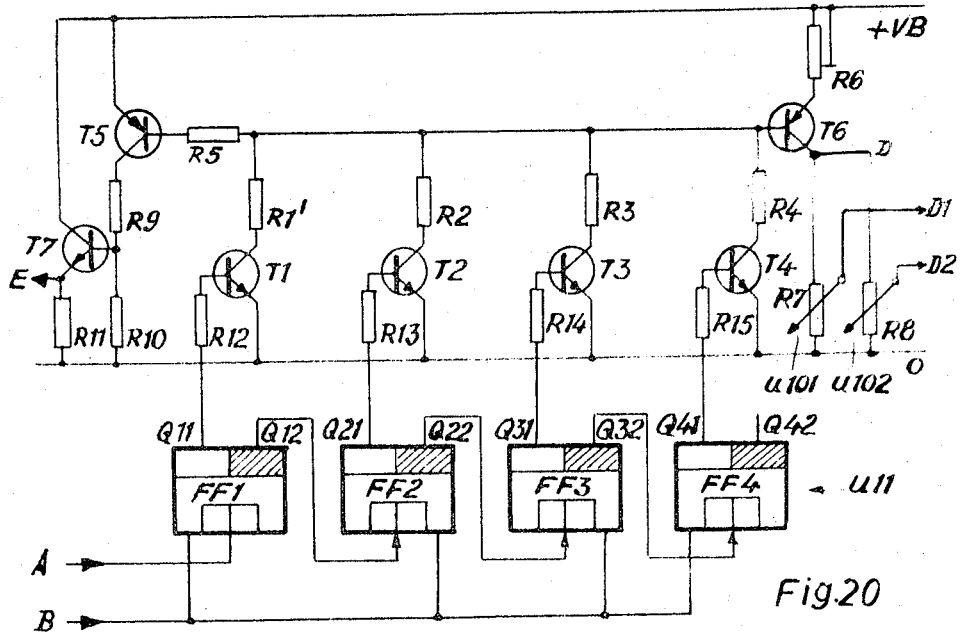
FIG. 20 is a diagrammatic view of a detail in the structure of FIG. 19.

The details of a suitable source $u11$ are illustrated in FIG. 20. It comprises four bit storage devices or flip-flops FF1 to FF4, four switching transistors $t1$ to $t4$ which are connected to the output terminals of the respective flip-flops, collector resistors R1', R2, R3, R4, an integrating resistor R5, an output amplifier with transistor T6 and a switching transistor T5 with an emitter follower stage comprising transistor T7.

The four flip-flops are connected to form a binary counter which operates in accordance with the code 8-4-2-1 and can be set by way of conductor B. The counter is of the backward counting type when reset pulses are applied to the input A. The outputs Q11–Q41 of the flip-flops FF1–FF4 are connected with the transistors T1–T4 by way of resistors R12–R15. These transistors are driven to saturation and thus act as closed switches when the voltage at the corresponding outputs of the flip-flops corresponds to the flip-flop supply (binary condition L). Voltage at the outputs of the flip-flops FF1–FF4 is indicated by hatching, i.e., there is no voltage at the outputs Q11, 21, 31 and 41 (binary condition 0) for the condition shown in FIG. 20. The transistors T1 to T4 are nonconductive. This is the zero condition of the counter.

Figure 21:
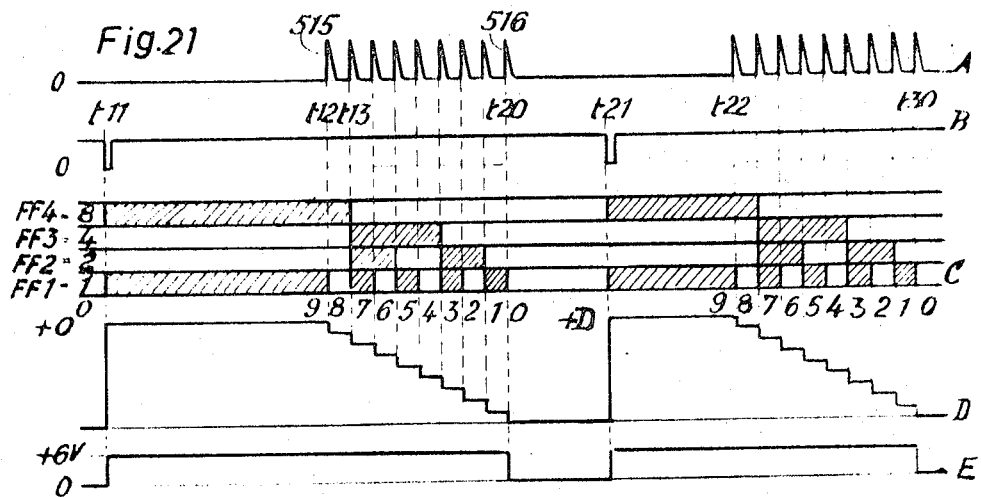
FIG. 21 is a diagram illustrating the mode of operation of motors for the transmission of FIG. 15.

The portion C of FIG. 21 employs similar indications. A hatched box at a particular time period indicates that the switching transistor connected to the corresponding flip-flop output is conductive. For example, during the interval $t11$–$t12$, the transistors T1 and T4 are conductive.

Referring back to FIG. 20, the resistors R1'–R4 form with the resistor R5 a voltage divider whose ratio depends on which of the transistors T1–T4 conducts current. In the interval between $t11$–$t12$, when the transistors T1 and T4 are conductive, a current flows through the resistors R1' and R4 and the voltage +VB is divided according to ration R5:(R1'×R4).

Due to its relatively large emitter resistor, the transistor T6 acts not unlike a current source with impressed current whose magnitude is proportional to voltage at the resistor R5. Such current causes a voltage drop at the parallel-connected potentiometers R7, R8 which are in the collector circuit of the transistor T6, and such voltage drop is proportional to voltage at the resistor R5. The sliders of the potentiometers R7, R8 (which correspond to the selectors $u101$, $u102$ of FIG. 19) can furnish a continuously variable portion of the voltage at the point D. The voltage D1 furnished by the slider of the potentiometer R7 serves as a rated voltage for the r.p.m. of the motor $m_1$ during the intervals $t1+t2$ (i.e., for transport of the output member I from the station S1 to the station S2). The voltage D2 at the slider of the potentiometer R8 determines the r.p.m. of the motor $m_1$ during the intervals $t3+t4$ (transport of the output member I from station S2 back to the station S1).

The resistance of resistors R1'–R4 are selected in such a way that the ratio of currents $i1:i2:i3:i4$ is the same as the selected code (1:2:4:8). Thus, at the time $t11$ (FIG. 21), current flowing through the resistor R5 is $1\times i1+8\times i1=9\times i1$. Since the counter of FIG. 21 is also in the position 9, the voltage drop across the resistor R5 and hence the voltage at the point D is proportional to the position of the counter (digital-analog converter).

The functions of the transistor T5 are as follows: Its base-emitter voltage has approximately the same magnitude and undergoes the same variations with temperature as those of the transistor T6, i.e., the voltage at the resistor R6 is practically identical with that at the resistor R5 to compensate for the temperature variations of T6. Furthermore, the resistors R1'–R5 are dimensioned in such a way that the transistor T5 conducts at a maximum rate when any one of the transistors T1–T4 conducts current. Thus, the voltage at the point E (FIG. 20) has a magnitude which is determined by the voltage +VB and the ratio of the voltage divider R9, R10.

When all four transistors T1–T4 are nonconducting, i.e., when the counter assumes the zero condition, the voltage at the point E equals zero. The sudden drop in voltage from approximately +6 volts to zero (see the curve E in FIG. 21) is employed in the logic circuit $u7$ of FIG. 18 or in the circuit $u7'$ of FIG. 19 as a signal which terminates coarse positioning of the output member I and actuates the switching unit $u9$ of FIG. 19 to start fine or final positioning of the output member.

The operation of the reference voltage source with attenuator $u11$ will be described with reference to FIG. 21 in connection with a digital-analog converter with nine switching positions.

1. In the starting condition, the counter stand is zero (see FIG. 21C), the output voltage at D equals zero (FIG. 21D), the output voltage at E equals zero (FIG. 21E) and the motor $m_1$ is at a standstill.
2. At the time $t11$ the conductor B transmits a set signal (FIG. 21B) produced by the stop signal $t59$ from the programming unit $u5$ (FIG. 18). The counter jumps from zero to nine (FIG. 21C), the output voltage at D rises to the maximum value D1 and the output voltage E rises to +6 volts. The motor $m_1$ is started and advances the output member I.
3. At the time $t12$, the input A of FIG. 20 transmits the first countdown signal. Such signal is produced by the photoelectric cell $p_1$ and is transmitted by way of the amplifier $u12$ (see $u14$ in FIG. 19). The counter jumps to 8, the voltage D1 decreases by one-ninth of maximum voltage D1 and the speed of the motor $m_1$ is reduced accordingly.
4. At the time t—the input A transmits a further countdown signal which causes the counter to count down to seven. The voltage D1 decreases by another ninth of the maximum voltage and the rotational speed of the motor $m_1$ decreases accordingly. Similar changes take place at the times $t14$–$t19$.
5. At the time $t20$, the input A transmits a ninth signal which causes the counter to reset to zero. The voltage D1 decreases to zero, the voltage E also decreases to zero and this causes the generation of a signal indicating that the interval $t2$ is completed. The control unit $u9$ is then set for final positioning of the output member I. When the final positioning is completed, the output member I is held in optimum position at the station S2.

When the conductor B thereupon transmits a further set signal, for example, at the time $t21$ (FIG. 21), the same cycle is repeated and results in stepwise reduction of voltage D2 (FIG. 20). Depending on the setting of the selectors $u101$ and $u102$, the voltage D2 is equal to or different from the voltage D1. FIG. 22D shows a setting according to which the voltage D1 exceeds the voltage D2.

The changes in rotational speed of the motor $m_1$ during a full orbit of the output member I about the axis of the column 40 are shown in the lower part of FIG. 22. Thus, the motor $m_1$ is accelerated from zero speed (station S1 accommodates the output member I) at a rate depending on the setting of the resistor R1 (FIG. 19) and thereupon rotates at a constant speed which is determined by setting of the selector $u101$ (FIG. 19, corresponding to the potentiometer R7 of FIG. 20). When the output member I reaches a point at a predetermined distance from the station S2 (e.g., after turning through 180° about the axis of the column 40, see the lower part of FIG. 22), the coarse positioning stage begins and the motor $m_1$ is decelerated in several successive steps while the output member I covers an angular distance of about 40° (from 180° to 220° in FIG. 22). The start of the coarse positioning stage is initiated by the photoelectric signal generator $u14$ which transmits the first decelerating signal 515 (FIG. 21A). The last decelerating signal 516 turns off the unit $u10$ of FIG. 19 to terminate the coarse positioning of the output member I and a fine positioning reference signal to be described below is applied to regulating means $u8$.

An important advantage of the just-described mode of regulating the rotational speed of the motor $m_1$ as a function of the angular position of the output member I with reference to the column 40 is that the circuit $u7'$ of FIG. 19 can receive accurately defined signals which is of particular importance for final positioning of the output member. Thus, the circuit $u7'$ can bring about rapid and highly accurate positioning of the output member at each of the stations S1 and S2.

Since the rotational speed of the motor $m_1$ changes as a function of the angular position of the output member I with reference to the column 40, the machine must be provided with means for transmitting signals which indicate, with a high degree of accuracy, the momentary angular position of the output member so that such signals can be employed for regulation of the motor speed. These signals are produced by the aforementioned signal generating unit $u14$. As stated before, this unit comprises the photoelectric cells p1, p2, the punched disks L1, L2, L3, and the stepdown transmission G2.

Figures 23, 24:
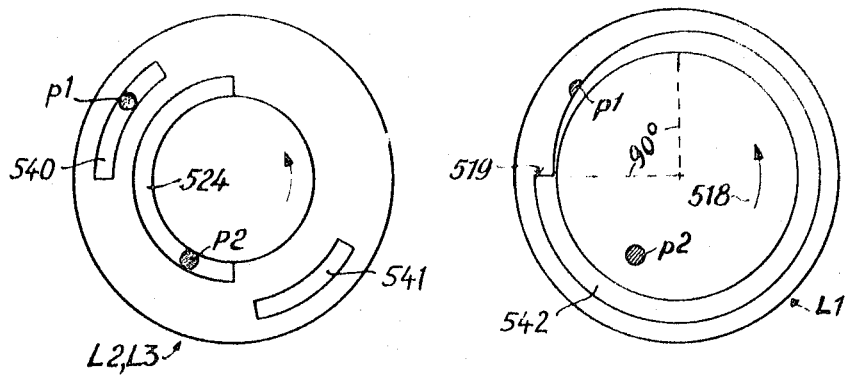
FIG. 23 is a plan view of a disk combining two coded disks in the structure of FIG. 19.
FIG. 24 is a similar plan view of another disk.
Figure 25:
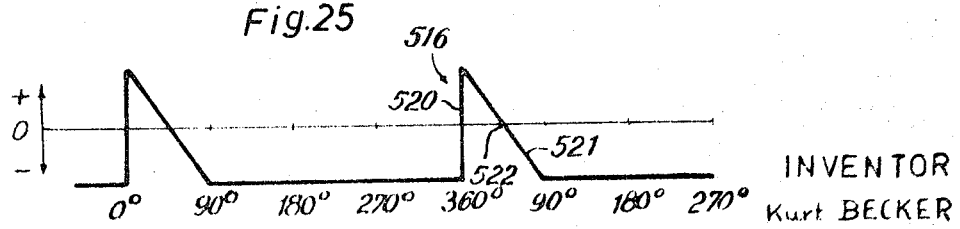
FIG. 25 is a diagram indicating the nature of impulses which are produced by the disk of FIG. 24.

The disk L1 rotates at the exact speed of the motor $m_1$ (see FIG. 19). The transmission G2 drives the disks L2, L3 at the same speed which is less than the speed of the disk L1. As mentioned above, the ratio of the transmission G2 is the same as that of the transmission G1 so that the rotational speed of the disks L2, L3 equals the rotational speed of the output member I. The disks L1, L2 cooperate with the photoelectric cell $p_1$ to produce decelerating signals (515 to 516 in FIG. 21A) for coarse and fine or final positioning of the output member I. The configuration of disks L2, L3 is shown in FIG. 23 wherein the two individual disks L2 and L3 according to FIG. 19 are combined in a single disk driven via transmission G2. The configuration of the disk L1 is shown in FIG. 24. All of these disks consist of translucent synthetic plastic material and are provided with opaque portions. The disk L2, L3 (FIG. 23) has a pair of translucent arcuate outer slots 540, 541 for the cell $p1$ and a single translucent inner slot 524 for the cell $p2$. The light sources which discharge light beams against the photosensitive surfaces of the cells $p1$, $p2$ are shown in FIG. 19 at $pp1$ and $pp2$ respectively. It will be seen that the cells $p1$, $p2$ are mounted at different distances from the common axis of the disks L1, L2. The disk L1 is coaxial with the disk L2, L3 and cannot influence the cell $p2$. It rotates in a counterclockwise direction, as viewed in FIG. 24 (see the arrow 518), and suddenly permits passage of light between the source $pp1$ and cell $p1$ (at 519) to thereupon gradually reduce the amount of light which can reach the cell $p1$ during rotation through 90°. During the remaining 270°, the disk L1 obstructs the passage of light between the source $pp1$ and cell $p1$. This causes the cell $p1$ to produce an output voltage which varies in a manner as shown in FIG. 21A and to a greatly enlarged scale in FIG. 25. The output of the amplifier $u12$ furnishes a positive potential when the cell $p1$ is exposed to light issuing from the source $pp1$. On the other hand, the output of the amplifier $u12$ furnishes a negative potential when the path for light from the source $pp1$ to the cell $p1$ is interrupted by the disk L1 and/or L2. The zero line of signals issuing from the amplifier $u12$ is therefore located midway between the two peak values. When the trailing edge 519 of the opaque strip 542 on the disk L1 moves past the cell $p1$, the output voltage of the amplifier $u12$ rises suddenly from maximum negative to maximum positive voltage (see FIG. 25) and thereupon decreases gradually to maximum negative voltage while the disk L1 turns through 90°. Such maximum negative voltage then remains unchanged while the disk L1 completes three-fourths of a full revolution. All steep flanks 520 (FIG. 25) of signals furnished by the amplifier $u12$ are used as decelerating signals for the source of reference voltage with attenuator $u11$ in the circuit of FIG. 19. The inclined trailing edge 521 of the last pulse 516 of a series pulses produced by the cell $p1$ serves as a reference signal varying with angular position for the DC motor during fine positioning. Since the positive value of the trailing edge $t21$ tends to effect a forward rotation of the motor $m1$ and the negative value of this trailing edge 521 tends to cause the motor $m1$ to rotate in opposite direction, the motor $m1$ comes to a halt at the point 522 where the edge 521 intersects the zero line.

The reduction ratio of transmissions G1 and G2 is 72-to-one. Thus, each full revolution of the motor $m1$ corresponds to an angular displacement of the output member I by 5°. Consequently, the time required for the final pulse 516 of the cell $p1$ is 1.25° (the disk L1 of FIG. 24 completes one-fourth of a full revolution to interrupt the light beam between the source $pp1$ and cell $p1$). Therefore, the output member I can be readily positioned with an accuracy within 10 minutes or one-sixteenth of a degree.

The registering inner slit 524 of the disk L2, L3 (FIG. 23) transmits signals to the logic circuit $u7'$ of FIG. 19. The slit 524 permits passage of light from the source $pp2$ to the cell $p2$ during one-half of a full revolution of the output member I about the colum 40). Thus, the cell $p2$ indicates whether the output member I is close to the station S1 or S2. This relatively coarse information indicating the angular position of the output member I suffices because the circuit $u7'$ produces an output signal in dependency on several additional factors.

As stated before, the circuit $u7$ or $u7'$ preferably employs diodes. The conditions which must be met before the circuit $u7'$ produces an output signal are as follows:

1. In the starting condition, the motor $m1$ is at a halt, the reference value of the rotational speed is zero (source $u11$), the reference value of rotational speed for final positioning is zero (amplifier $u12$), the blank mold 101 is ready to receive a gob from the funnel of the gob feed, and the output member I dwells at the pressing station S1.
2. The operation of the programming unit $u5$ is triggered by the gob when the conditions enumerated at (1) above are met.
3. The motor $m1$ is started in response to signal $t59$ from the programming unit $u5$. The output voltage at R7 ($u101$) develops in response to above and signal from amplifier $u13$, thus furnishing the reference signal for angular rotation.
4. When the output member I reaches a point about 40° ahead of the station S2, the amplifier $u12$ furnishes decelerating pulses.
5. When the output member I reaches a point about 5° ahead of the station S2, the counter is reset to zero and the unit $u9$ initiates the final positioning of the output member I (signal from $u12$).
6. The operation of the programming unit $u6$ is triggered when the rotational speed of the motor $m1$ is zero ($u11$), when the final positioning of the output member I is terminated ($u12$) and when the output member I dwells at the station S2 ($u13$).
7. The motor $m1$ is started in response to signal $t69$ from the programming unit $u6$ when all of the conditions enumerated at (6) above are met.
8. The amplifier $u12$ starts to furnish decelerating signals when the output member I reaches a point about 40° ahead of the station S1.
9. The counter is reset to zero when the output member I reaches a point about 5° ahead of the station S1 and the unit $u9$ initiates the final positioning of the member I.
10. The parts return to their original positions upon completion of the cycle.

A very important advantage of my machine is that each holder 81 receives motion from a separate drive, namely, from a separate output member 80. Therefore, each holder 81 can be accelerated, decelerated, started or arrested independently of the other holders to insure maximum utilization of instrumentalities at the stations $S_1$, $S_2$ by insuring that the blanks and parisons dwell at such station for periods whose length is determined exclusively by the time required for completion of treatment at the respective station. This means that a parison need not leave the pressing station S1 when a finished article 85 leaves the blowing station S2, or vice versa. Savings in space are achieved by moving the holders 81 about common axes, i.e., about the axes of columns 40 and 41. Of course, such orbiting of holders 81 about the axis of the column 40 or 41 does not exclude movements radially and/or axially of the respective column when such movements are desirable or necessary (refer to FIG. 2).

It is equally within the purview of my invention to mount the parts at the stations S1 and S2 in such a way that they travel with the holders 81 during treatment of gobs and/or parisons. However, stationary pressing and blowing stations are preferred at this time because the movements of parts at such stations can be regulated with greater accuracy and with minimal outlays for control equipment. If the parts at the stations S1 and S2 are mounted for movement with travelling holders 81, the machine can employ a greatly simplified programming system for the holders because all parts which effect starting and stoppage of holders can be dispensed with.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

What is claimed as new and desired to be protected by Letters Patent is set forth in the appended claims.

1. In a machine for the production of hollow articles consisting of vitreous or synthetic plastic material, a combination comprising a plurality of treating stations arranged spaced from each other along an endless predetermined path; means provided at said stations for treating workpieces of such material to ultimately transform said workpieces into hollow articles, a plurality of work-supporting devices arranged to transport workpieces along said path and into registry with said means at said treating stations; separate prime mover means for each of said work-supporting devices; and control means for controlling the operation of each prime mover means independently of the other prime mover means for regulating the movement of the work-supporting device at and between said stations as a function of the time required for treatment of the workpieces carried by the respective work-supporting device at and between the respective station.

2. A combination as defined in claim 1, wherein said treating stations comprise at least one pressing station for pressing a gob of such material into a parison and at least one blowing station spaced in the direction of movement of said work-supporting devices from said pressing station for blowing the parison produced in said pressing station into a finished hollow article.

3. A combination as defined in claim 1, wherein said predetermined endless path is a substantially circular path and including means connecting each of said prime mover means to a respective one of said work-supporting devices to orbit the latter along said circular path.

4. A combination as defined in claim 1, wherein said work-supporting devices are disposed in groups arranged to transport workpieces along separate paths, a plurality of said treating stations being arranged along each of said paths.

5. A combination as defined in claim 1, and further comprising drive means for said treating means, and programming means for said control means and said drive means.

6. A combination as defined in claim 1, wherein at least one of said stations is stationary and wherein said prime mover means are arranged to arrest the respective work supporting devices at least at one of said stations.

7. A combination as defined in claim 1, wherein at least one of said stations is a mobile station and further comprising means for moving said one station in synchronism with said work-supporting devices.

8. A combination as defined in claim 7, wherein each of said work supporting devices is arranged to register with said one station during travel along a predetermined portion of said path.

9. A combination as defined in claim 1, further comprising at least one stationary pressing station adjacent to said path, means at said station for converting blanks into parisons constituting one form of said workpieces, a stationary second station adjacent to said path downstream of said pressing station and means at said second station for converting parisons into finished hollow articles, each of said work-supporting devices comprising a carrier for workpieces.

10. A combination as defined in claim 9, wherein the means at said second station comprises a mobile blow mold bottom member, a multisection blow mold, gripper means carrying said blow mold for coupling successive work supporting devices with parisons therein to said bottom member, and a blowing unit for admitting a blowing medium into parisons to thus convert such parisons into finished hollow articles while the corresponding work supporting devices are engaged by said blow bold.

11. A combination as defined in claim 9, wherein the means at said stations include movable components and separate driving units for such movable components.

12. A combination as described in claim 1, further comprising transmission means interposed between said prime mover means and said work-supporting devices.

13. A combination as defined in claim 12, wherein said transmission means is a stepdown transmission.

14. A combination as defined in claim 13, wherein said transmission comprises a plurality of rotary output members each supportingly connected with one of said work-supporting devices.

15. A combination as defined in claim 14, wherein said transmission further comprises gears each connected with and arranged to move one of said output members.

16. A combination as defined in claim 15, wherein said gears are internal gears and said output members extend outwardly from the respective gears.

17. A combination as defined in claim 4, wherein each of said separate paths has at least one common point with one other of said separate paths.

18. A combination as defined in claim 16, wherein said internal gears are arranged to rotate about a common axis and wherein said transmission further comprises separating means interposed between said gears.

19. A combination as defined in claim 18, wherein said separating means include two outermost separating means and said transmission further comprises a case including said outermost separating means.

20. A combination as defined in claim 18, wherein said transmission further comprises centering means extending axially through said gears and said separating means, and distancing means interposed between said separating means.

21. A combination as defined in claim 18, wherein said separating means comprises a pair of outermost separating means and wherein said transmission further comprises clamping means connecting said outermost separating means against relative movement axially of said gears.

22. A combination as defined in claim 15, wherein said gears are coaxial and said transmission further comprises means for locating said gears against radial and axial movement with reference to each other.

23. A combination as defined in 22, wherein said locating means comprises distancing and clamping elements and wherein said gears are internal gears which surround said elements.

24. A combination as defined in claim 16, wherein said prime mover means include a prime mover means for each of said gears and wherein said transmission further comprises pinions each driven by one of said prime mover means and each meshing with one of said gears.

25. A combination as defined in claim 14, wherein said output members are arranged to orbit about a common axis and are movable angularly with reference to said common axis and spaced from each other in the direction of movement, said work supporting devices being connected with the respective output members in such a way that they transport workpieces in a common plane.

26. A combination as defined in claim 1, wherein each of said work-supporting devices comprises a composite neck ring having sections movable with reference to each others between open and closed positions, and further comprising means for moving the sections of successive neck rings with reference to each other while the corresponding work supporting devices travel along at least one predetermined portion of said path.

27. A combination as defined in claim 1, further comprising a transfer station adjacent to said path downstream of said treating stations, and means for receiving finished articles from said devices at said transfer station.

28. A combination as defined in claim 27, wherein the means for receiving finished articles comprises conveyor means located at a level below said path.

29. A combination as defined in claim 28, wherein said conveyor means is arranged to travel at said transfer station at the same speed and in the same direction as the work-supporting devices which move past said transfer station.

30. A combination as defined in claim 29, wherein said work-supporting devices comprise neck rings having sections movable between open and closed positions in which they respectively support and release the respective workpieces, and further comprising means for moving said sections to open positions during travel of the respective neck rings past said transfer station.

31. A combination as defined in claim 4, wherein said devices are disposed in two groups and said paths have a common portion, one of said treating stations being adjacent to the common portion of said paths.

32. A combination as defined in claim 31, wherein the means at said one station comprises means for converting blanks into parisons.

33. A combination as defined in claim 31, wherein the means at said one station comprises means for converting parisons into finished articles.

34. A combination as defined in claim 31, further comprising frame means including a base member, a pair of columns extending upwardly from said base member, and a crosshead connecting the upper ends of said columns, each of said groups of work-supporting devices being arranged to orbit about one of said columns.

35. A combination as defined in claim 5, wherein said programming means comprises a programming unit or a plurality of programming units, one for each of said stations, for programming the treatment at each of said treating stations, and logic circuit means for interconnecting said programming unit or units with said control means in such a manner that each workpiece is moved to the subsequent treating station along said path after completion of treatment at the preceding treating station.

36. A combination as defined in claim 35, wherein each of said separate prime mover means comprises a direct current motor with regulatable rotational speed.

37. A combination as defined in claim 35, further comprising synchronizing means for synchronizing the operation of said plurality of programming units.

38. A combination as defined in claim 35, wherein said control means comprises a plurality of separate control means, one for each of said prime mover means, and wherein each of said separate control means comprises position signal generating means for generating position signals each signifying that the corresponding devices has reached a predetermined position along said path.

39. A combination as defined in claim 38, wherein said position signal generating means comprise photoelectric means.

40. A combination as defined in claim 39, wherein each of said prime mover means comprises an electric motor having a rotary shaft and each of said photoelectric means comprises a source of light, one on a plurality of disks having translucent portions coupled to the shaft of the respective motor and located in the path of light from said light source in such a manner that light transmitted through a disk is a function of the angular position of the respective shaft, and photoelectric transducing means for receiving the light transmitted through said disks and for generating electrical position signals in correspondence thereto.

41. A combination as defined in claim 40, wherein each of said motors is a shunt-wound direct current motor having a speed that varies as a function of armature voltage, and wherein each of said control means further comprises a source of reference voltage for supplying a reference voltage to the armature of the respective motor for causing the motor to rotate at rated speed, and for decreasing said reference voltage in response to selected ones of said position signals to cause the motor to decrease its speed when approaching a stationary station.

42. A combination as defined in claim 41, further comprising means for limiting the armature current in such a manner that no excessive acceleration can take place.

43. A combination as defined in claim 41, wherein said source of reference voltage comprises digital counting means set to a predetermined number and means for counting back on said counting means in response to said selected ones of said position signals.

44. A combination as defined in claim 43, wherein said source of reference voltage constitutes first positioning means and further comprising fine positioning means and a switching unit for switching from said source of reference voltage to said fine positioning means in response to the position signal causing the last countback on said counting means.

45. A combination as defined in claim 44, wherein the position signal generated within a predetermined small angle immediately preceding the desired positions of the workpiece has a trailing edge starting at a positive polarity and ending at a negative polarity, and wherein said fine positioning means comprises means for furnishing said electrical position signals generated within said predetermined small angle.

46. A combination as defined in claim 45, further comprising regulating means connected between said switching means and the respective motor.

47. A combination as defined in claim 46, wherein said regulating means comprise means for comparing a voltage proportional to the actual motor speed to a variable reference voltage furnished via said switching means and generating an error voltage as a function of the difference between said voltages; and output means for supplying voltage to said motor in response to said error voltage in such a manner that said error voltage is reduced toward zero.

48. A combination as defined in claim 47, wherein said output means comprise an output stage having a rectifier whose output voltage for four-quadrant operation is settable by means of the phase cut-in method.

* * * * *